US010788612B2

(12) United States Patent
Nagatani

(10) Patent No.: US 10,788,612 B2
(45) Date of Patent: Sep. 29, 2020

(54) LIGHT-EMITTING UNIT, DISPLAY APPARATUS, AND LIGHTING APPARATUS

(71) Applicant: Sony Corporation, Tokyo (JP)

(72) Inventor: Shinpei Nagatani, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 15/766,926

(22) PCT Filed: Aug. 18, 2016

(86) PCT No.: PCT/JP2016/074108
§ 371 (c)(1),
(2) Date: Apr. 9, 2018

(87) PCT Pub. No.: WO2017/068845
PCT Pub. Date: Apr. 27, 2017

(65) Prior Publication Data
US 2018/0306961 A1    Oct. 25, 2018

(30) Foreign Application Priority Data
Oct. 19, 2015    (JP) .................................. 2015-205598

(51) Int. Cl.
*F21V 8/00*    (2006.01)
*F21S 2/00*    (2016.01)
(Continued)

(52) U.S. Cl.
CPC .............. *G02B 6/0016* (2013.01); *F21S 2/00* (2013.01); *F21V 5/04* (2013.01); *G02B 6/003* (2013.01);
(Continued)

(58) Field of Classification Search
CPC .. G02B 6/0016; G02B 27/0955; G02B 6/003; G02B 2003/0093; G02F 1/133606; G02F 1/133504; F21V 5/04; F21S 2/00
See application file for complete search history.

(56) References Cited

U.S. PATENT DOCUMENTS 8,770,813 B2    7/2014    Bohn et al.
9,377,572 B2 *  6/2016    Kim ...................... G02B 6/001
(Continued)

FOREIGN PATENT DOCUMENTS

JP    2007294297 A    11/2007
JP    2011009208 A    1/2011
(Continued)

OTHER PUBLICATIONS

International Search Report corresponding to PCT/JP2016/074108, dated Nov. 22, 2016 (3 pgs.).

*Primary Examiner* — Kevin Quarterman
(74) *Attorney, Agent, or Firm* — Lerner, David, Littenberg, Krumholz & Mentlik, LLP

(57) ABSTRACT

A light-emitting unit includes first light-emitting sections, second light-emitting sections, and first and second light guide plates. The first and second sections, respectively, line up in first and second directions, and emit first and second light individually. The first plate includes first end and front surfaces; guides, along a second direction, a portion of the first light; and outputs the guided portion from the first front surface. The first and second end surfaces, respectively, along the first and second directions and face the first and second sections. The second direction is a direction getting away from the first end surface. The second plate includes second end and front surfaces; guides, along the first direction, a portion of the second light; and outputs the guided portion from the second front surface. The first and second (Continued)

plates are laminated to cause the first and second front surfaces to overlap each other.

16 Claims, 20 Drawing Sheets

(51) Int. Cl.
*F21V 5/04* (2006.01)
*G02B 27/09* (2006.01)
*G02F 1/1335* (2006.01)
*G02F 1/13357* (2006.01)
*G02B 3/00* (2006.01)

(52) U.S. Cl.
CPC ....... *G02B 6/0076* (2013.01); *G02B 27/0955* (2013.01); *G02F 1/133504* (2013.01); *G02F 1/133606* (2013.01); *G02B 6/0038* (2013.01); *G02B 6/0068* (2013.01); *G02B 6/0091* (2013.01); *G02B 2003/0093* (2013.01)

(56) References Cited

U.S. PATENT DOCUMENTS

| | | | |
|---|---|---|---|
| 9,739,921 B2* | 8/2017 | Kida | G02B 6/001 |
| 10,078,175 B2* | 9/2018 | Yamaguchi | G02B 6/0051 |
| 2006/0256579 A1 | 11/2006 | Yang et al. | |
| 2008/0204631 A1 | 8/2008 | Takada | |
| 2009/0052204 A1* | 2/2009 | Kawashima | G02B 6/0073 |
| | | | 362/555 |
| 2009/0268484 A1 | 10/2009 | Kim et al. | |
| 2012/0032997 A1 | 2/2012 | Cha et al. | |
| 2012/0075326 A1* | 3/2012 | Tsuchiya | G02B 6/0058 |
| | | | 345/589 |
| 2013/0033901 A1 | 2/2013 | Nishitani et al. | |

FOREIGN PATENT DOCUMENTS

| | | |
|---|---|---|
| JP | 2012018308 A | 1/2012 |
| JP | 2012069461 A | 4/2012 |
| JP | 2014132581 A | 7/2014 |

* cited by examiner

[ FIG. 1A ]
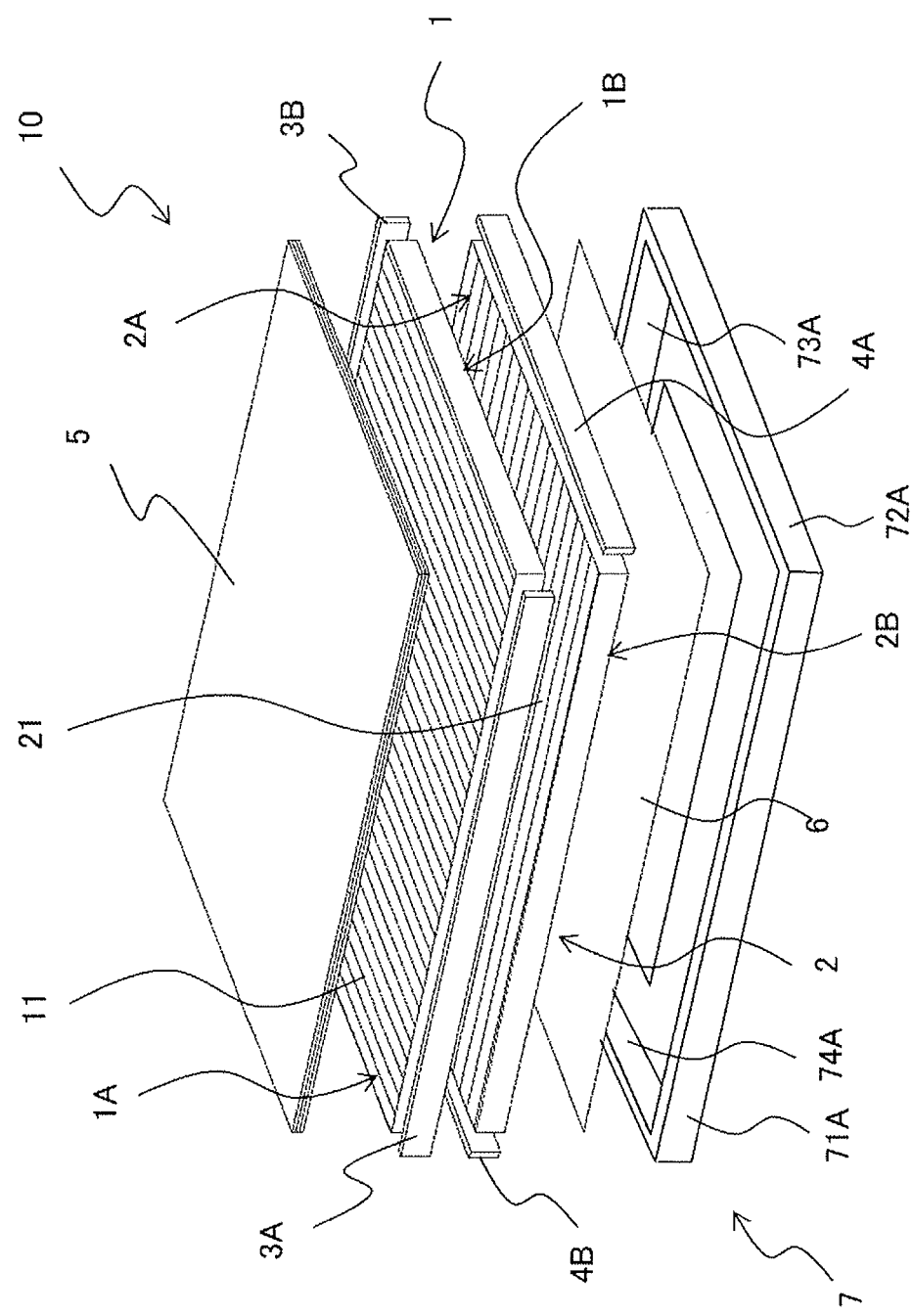

[ FIG. 1B ]
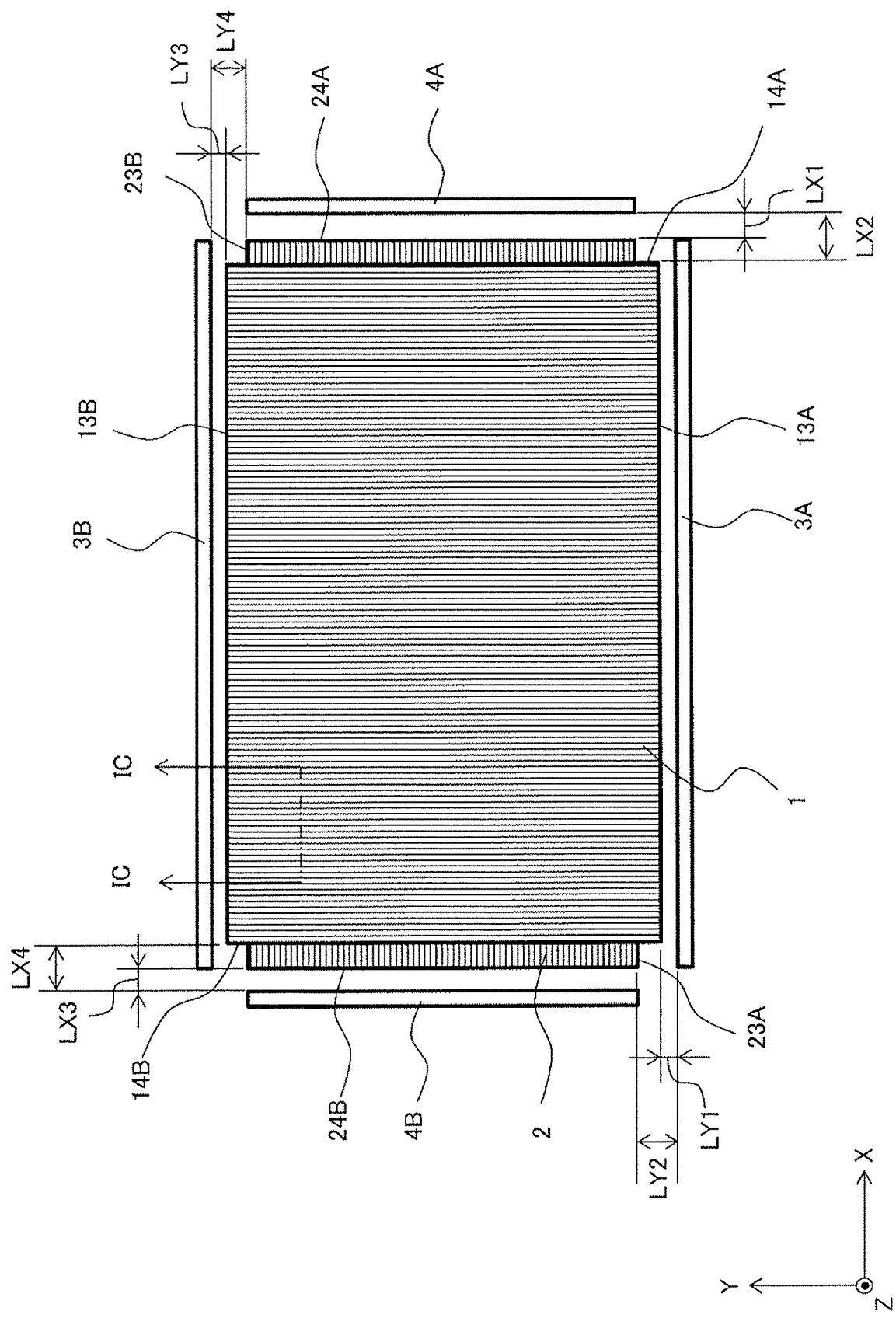

[ FIG. 1C ]
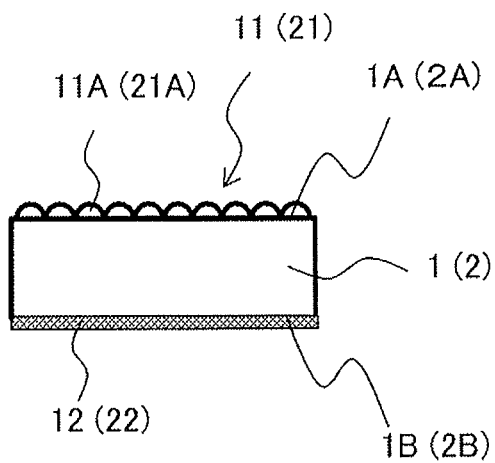
[ FIG. 1D ]
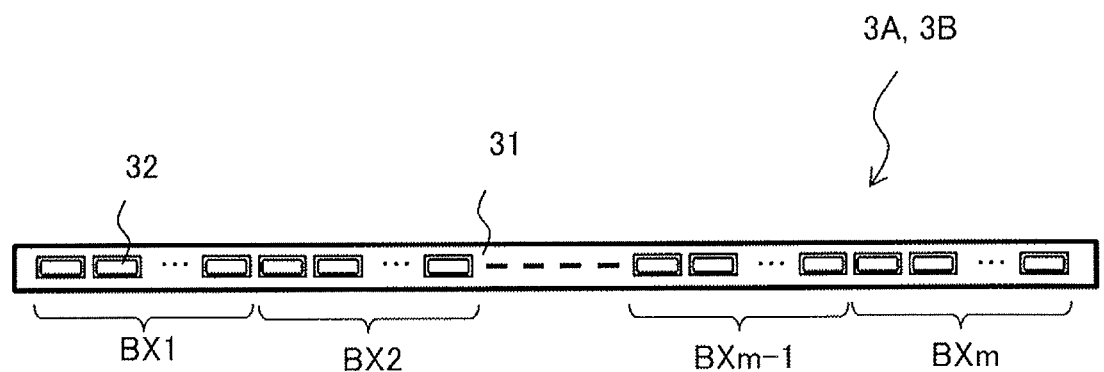
[ FIG. 1E ]
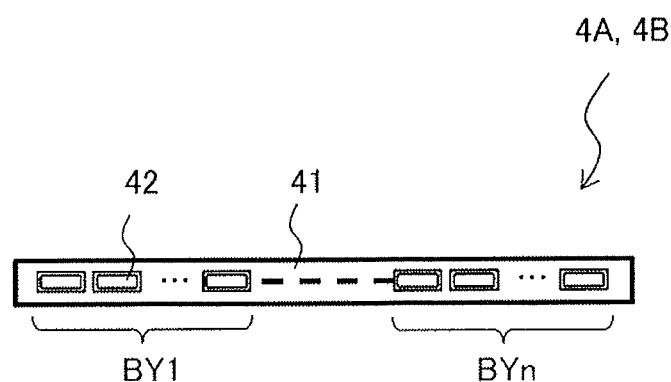

[ FIG. 1F ]
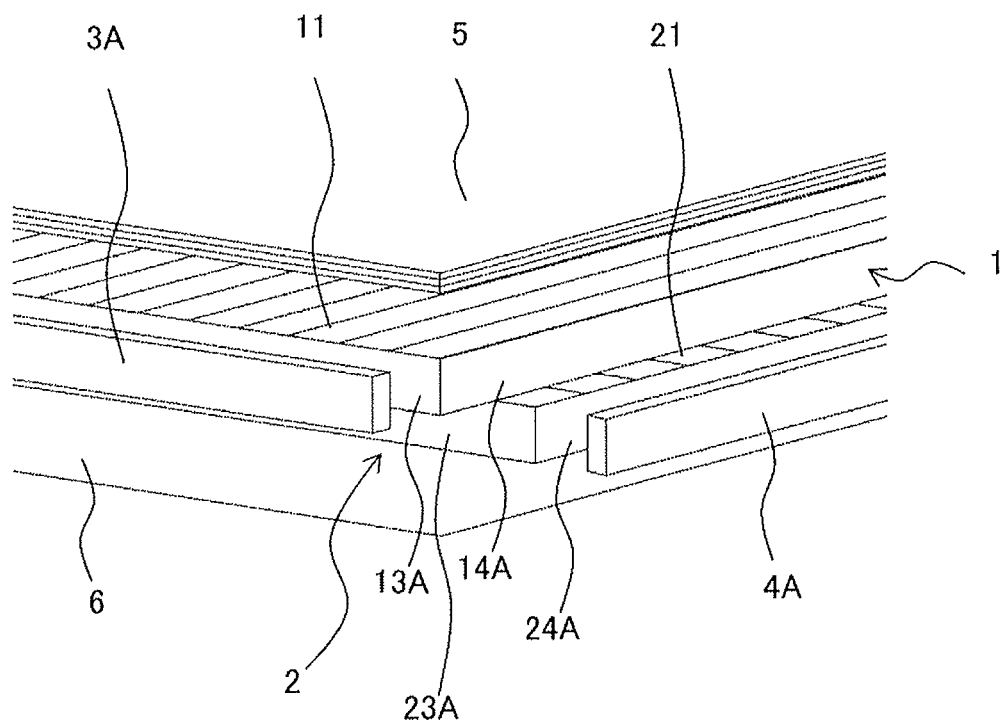

[ FIG. 2 ]
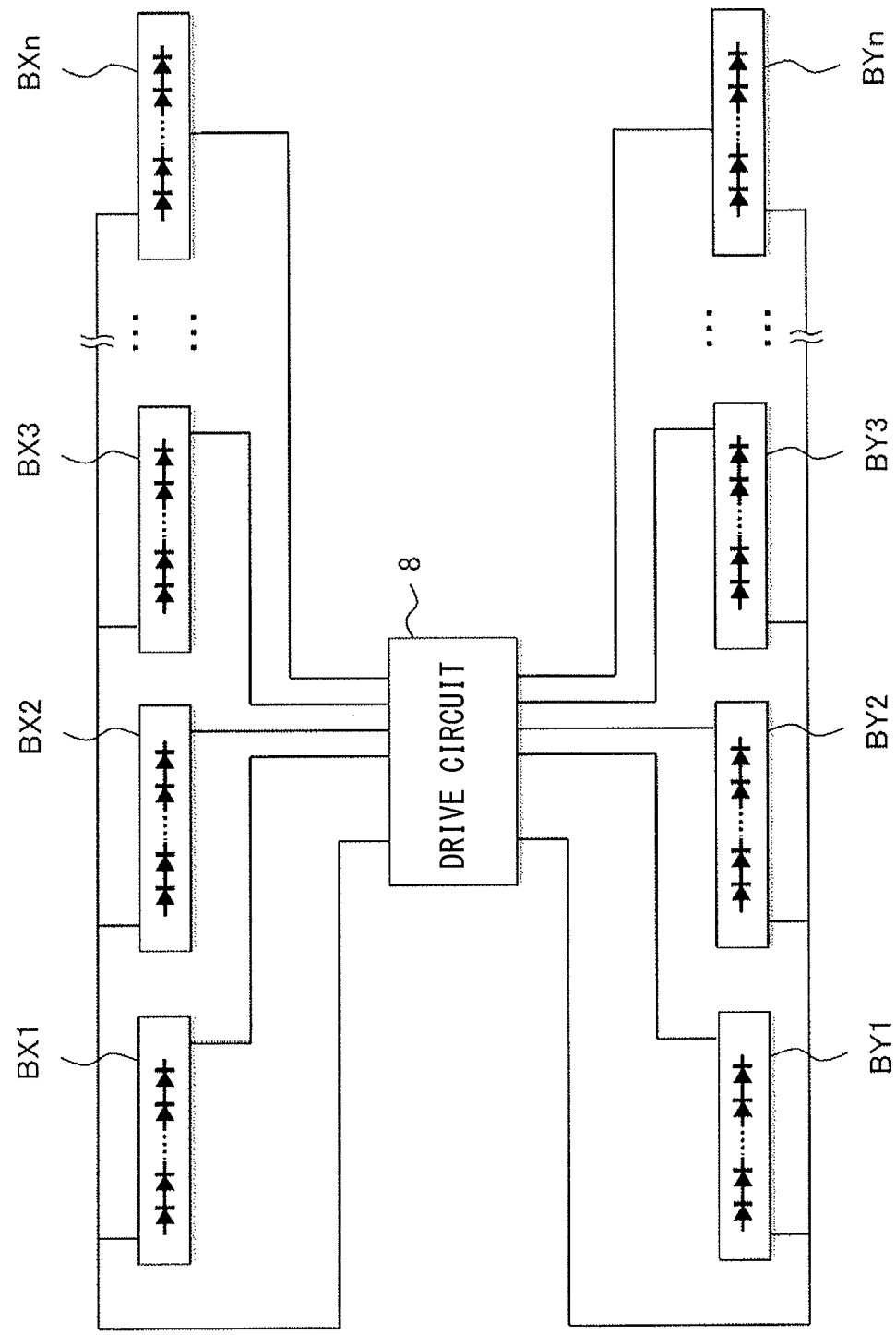

[FIG. 3A]
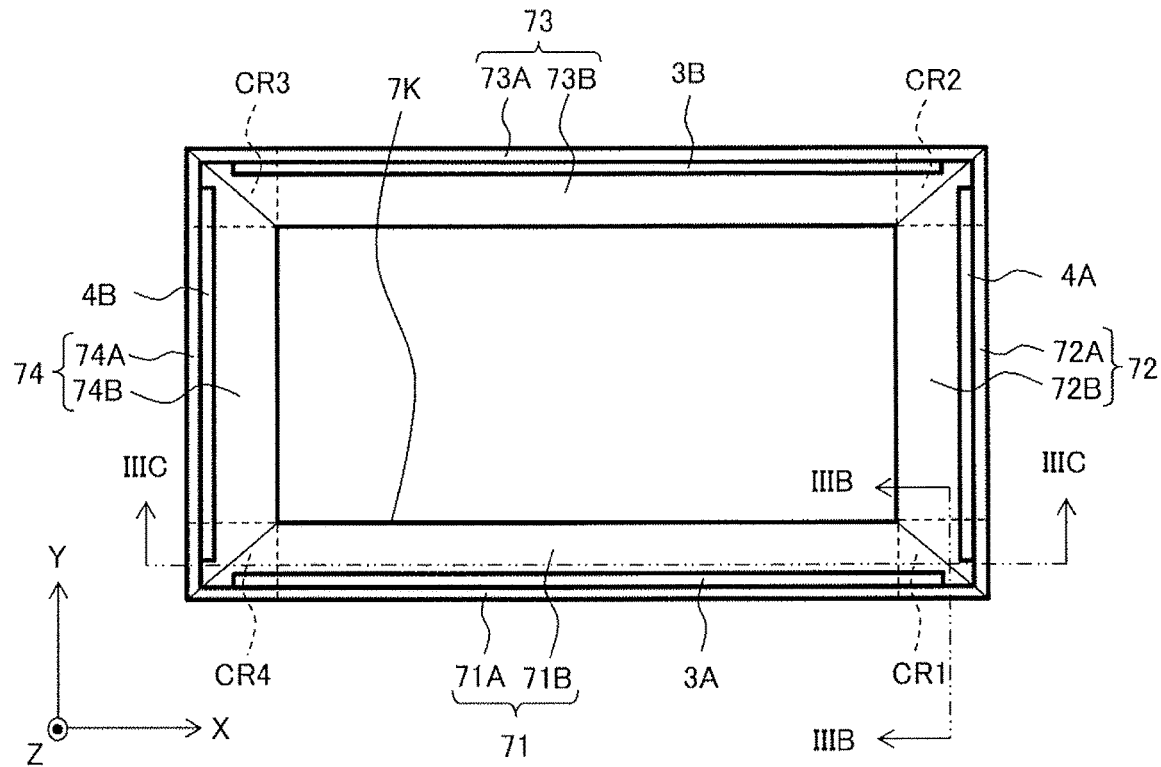
[FIG. 3B]
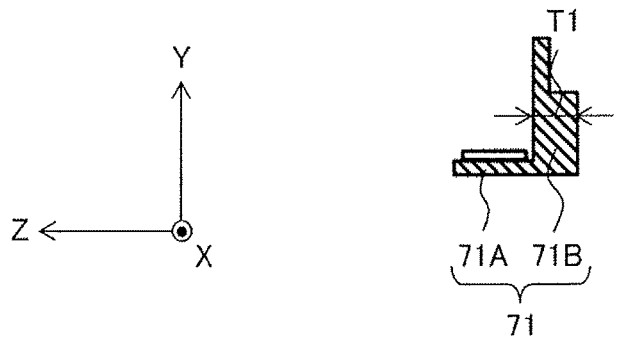
[FIG. 3C]
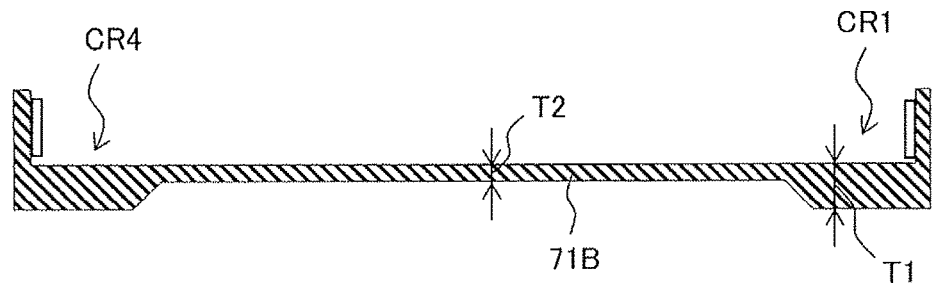

[FIG. 4]
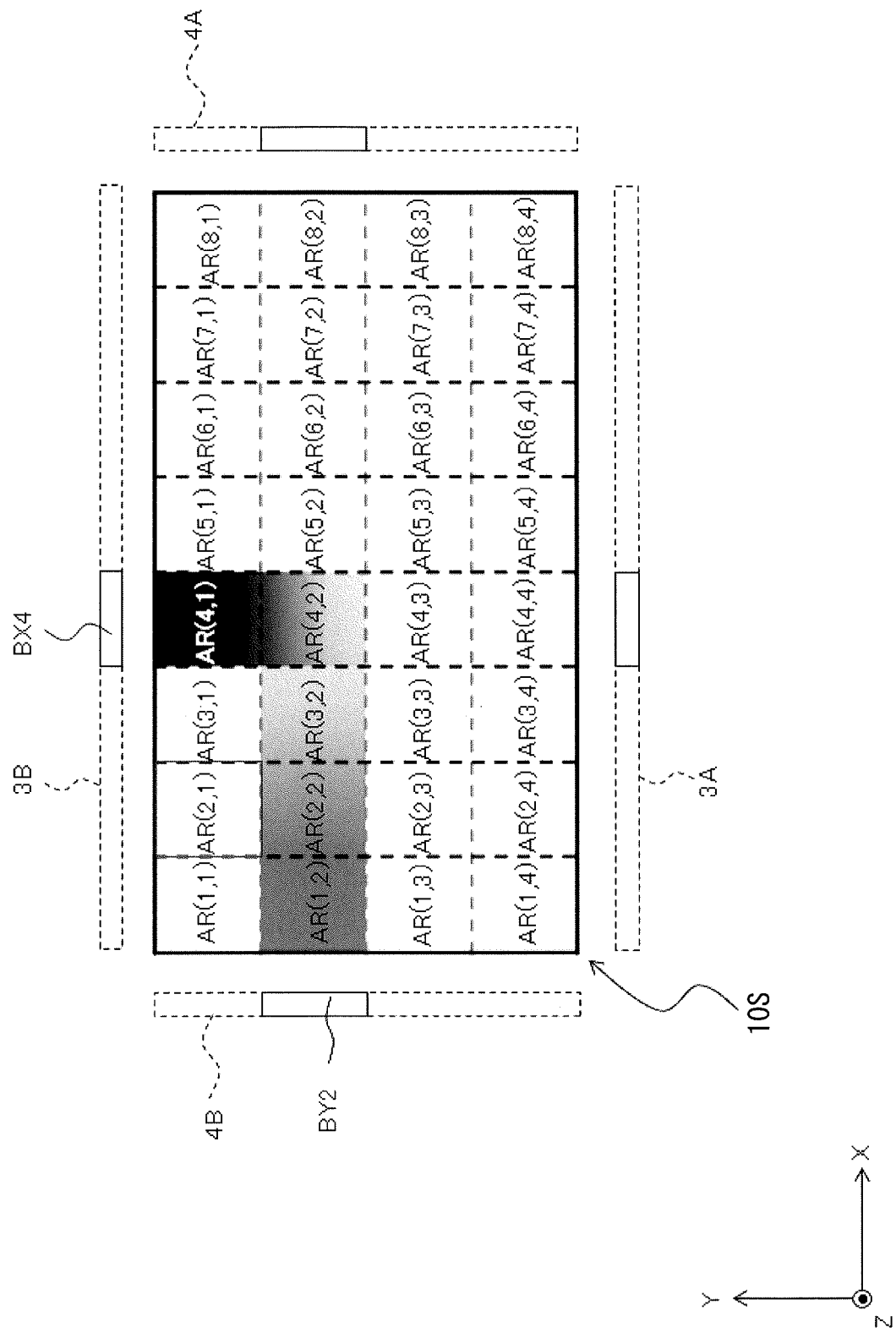

[ FIG. 5A ]
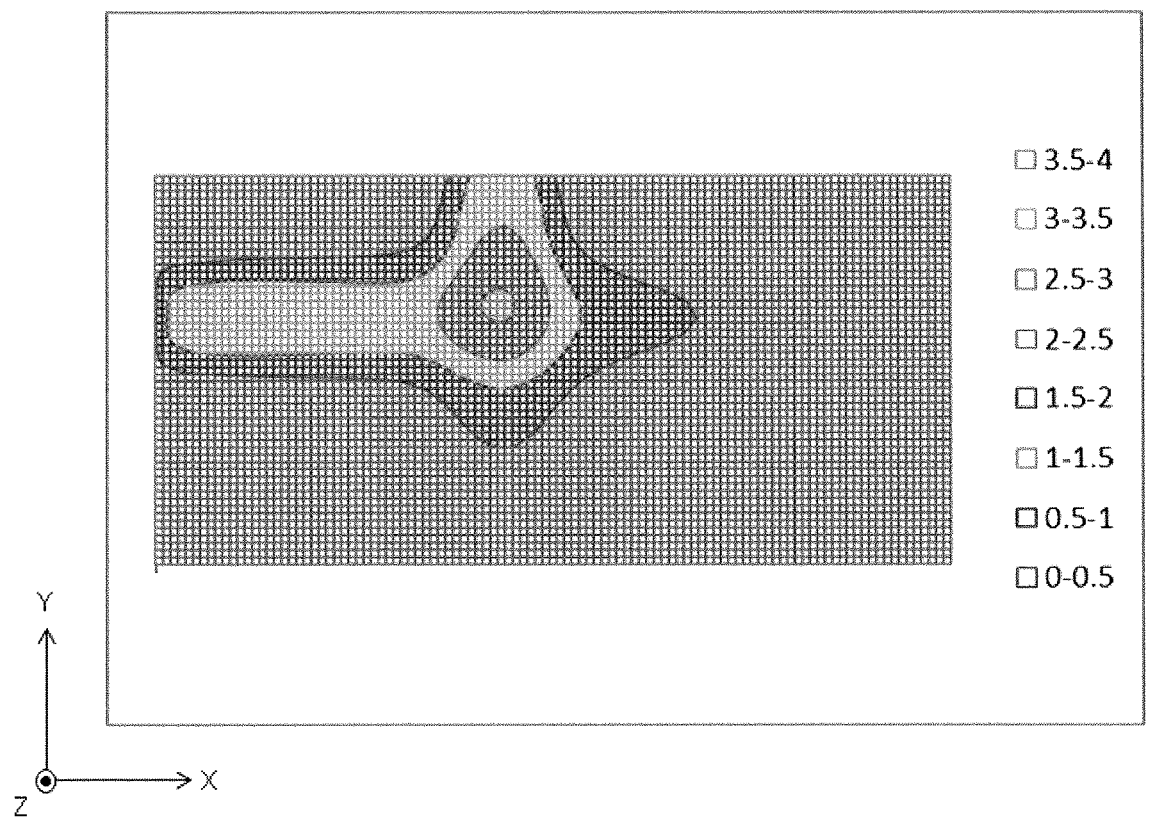
[ FIG. 5B ]
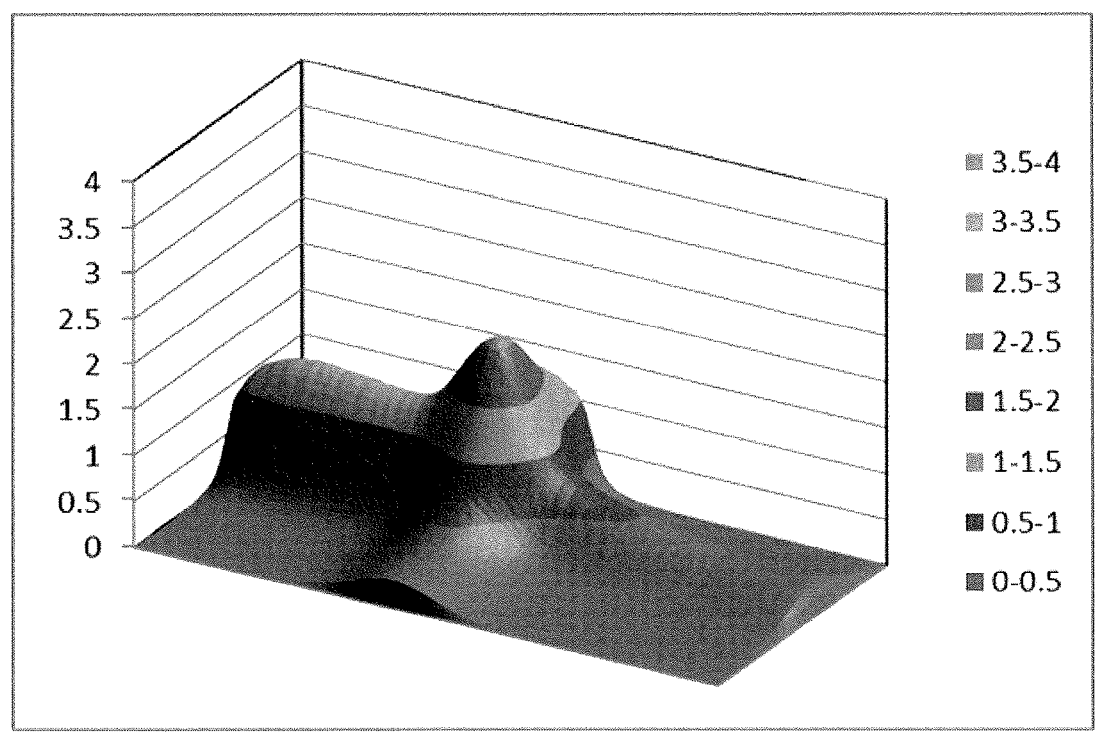

[FIG. 6]
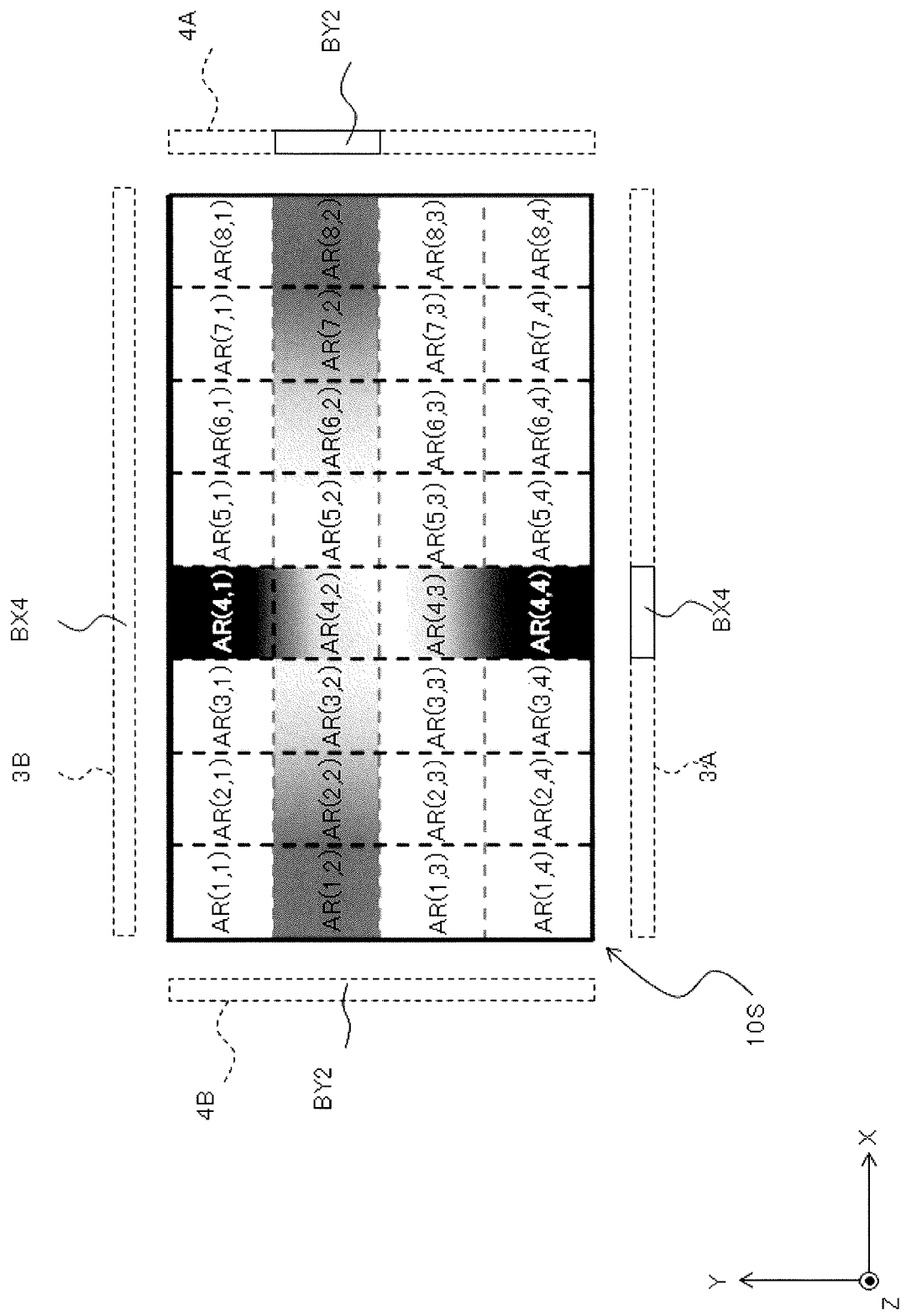

[ FIG. 7A ]
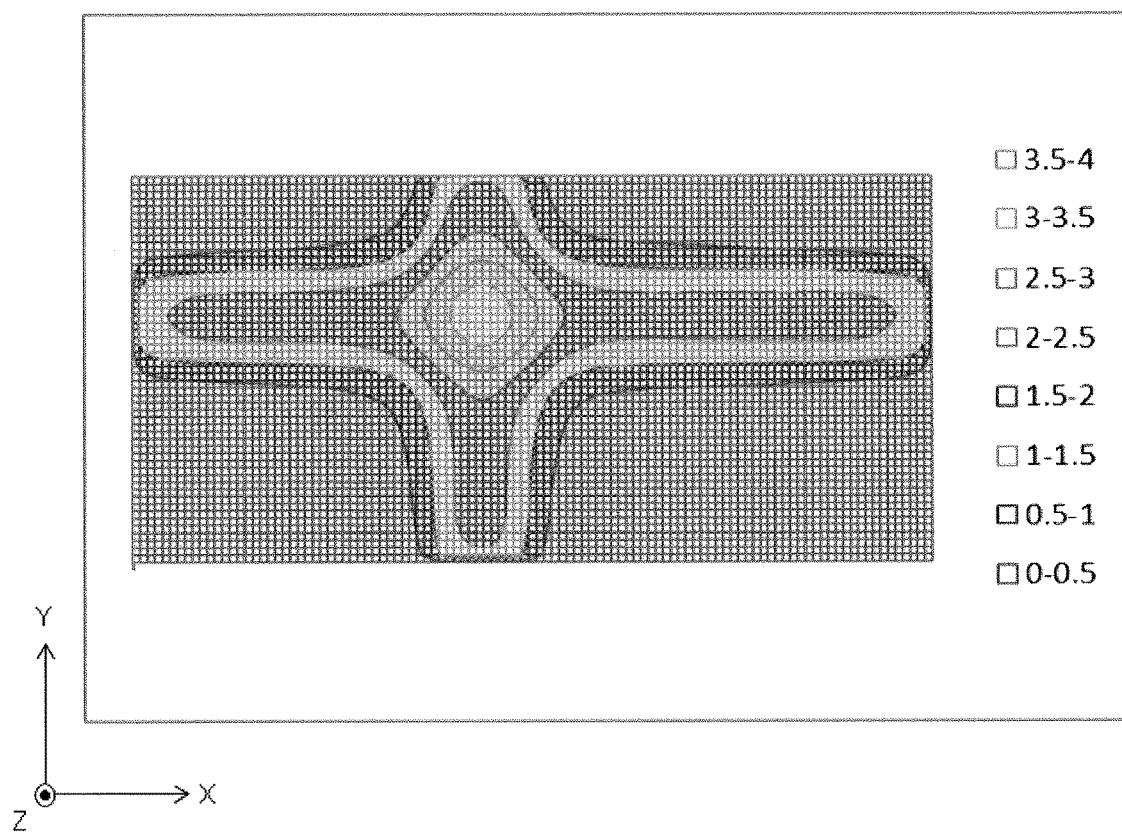
[ FIG. 7B ]
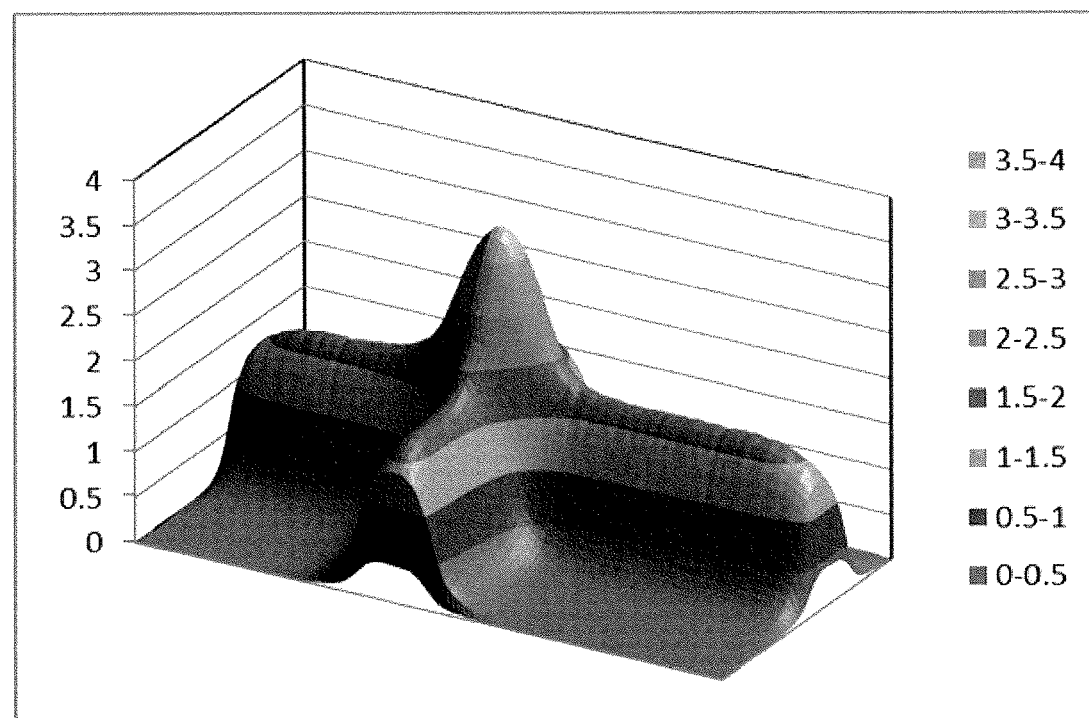

[ FIG. 8A ]
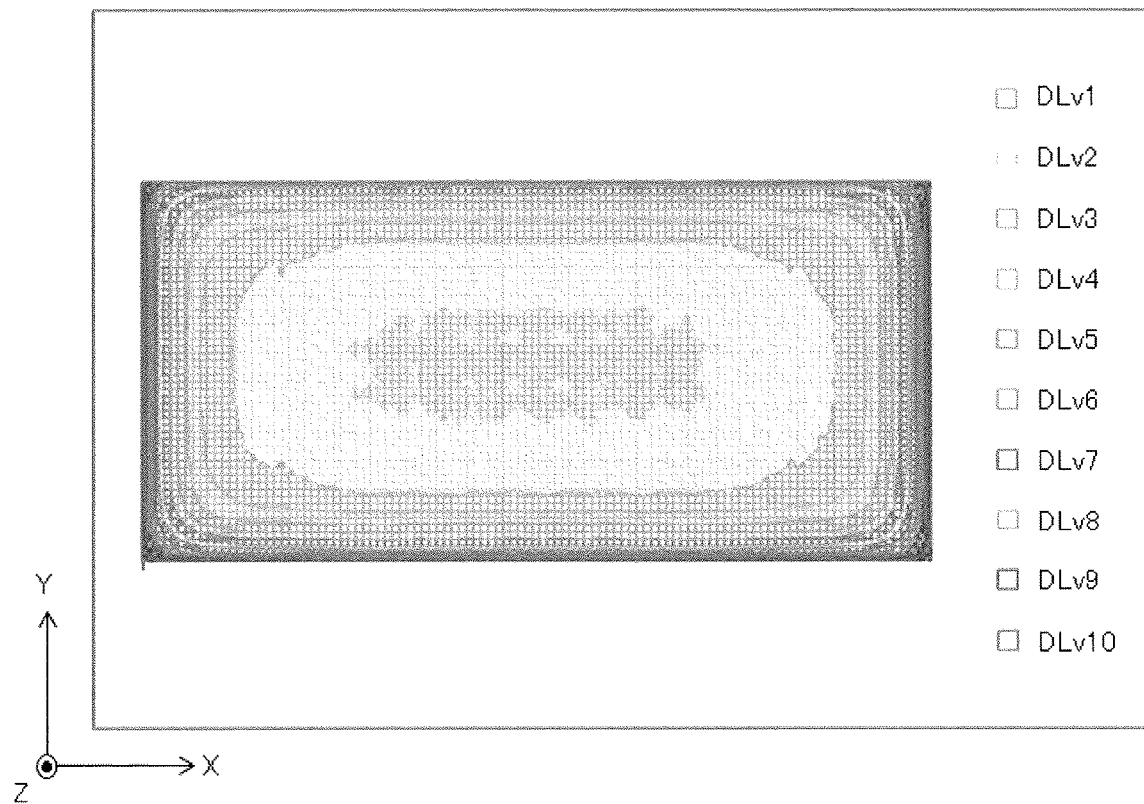
[ FIG. 8B ]
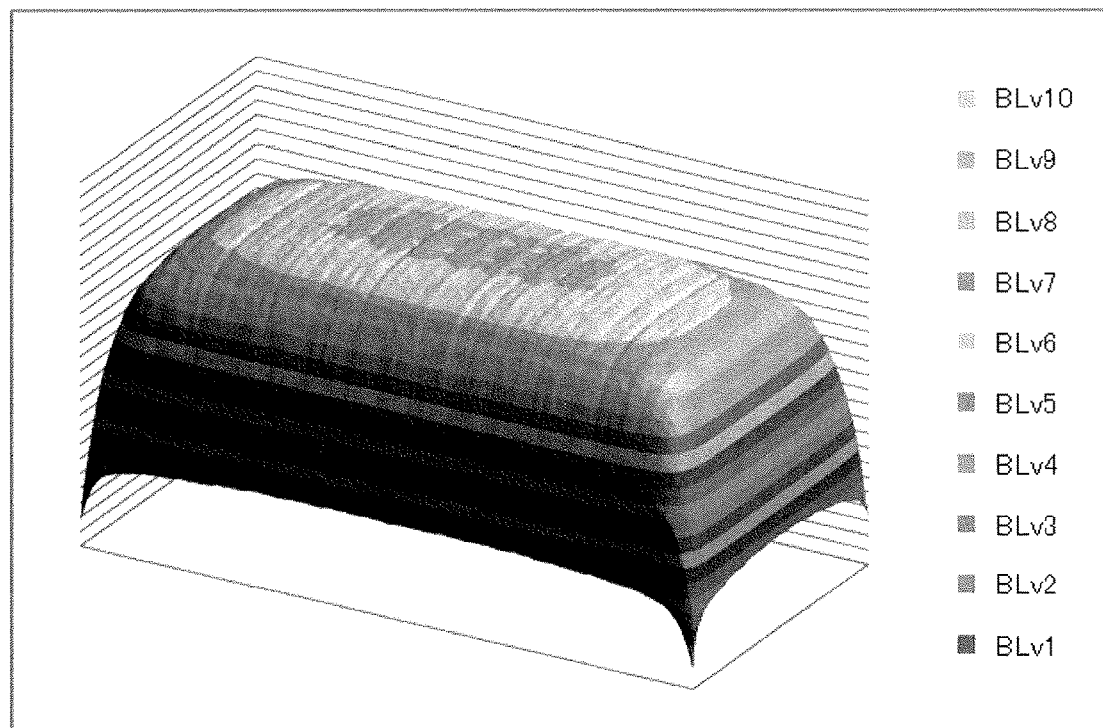

[ FIG. 9A ]
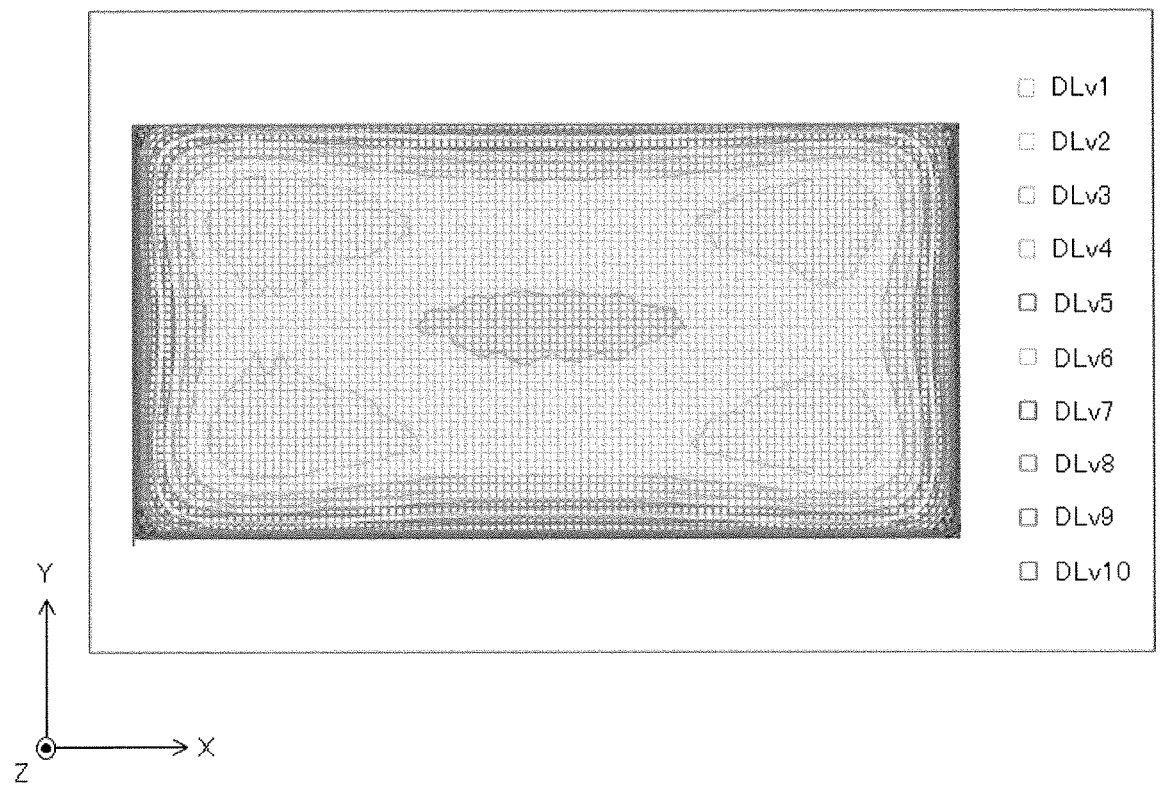
[ FIG. 9B ]
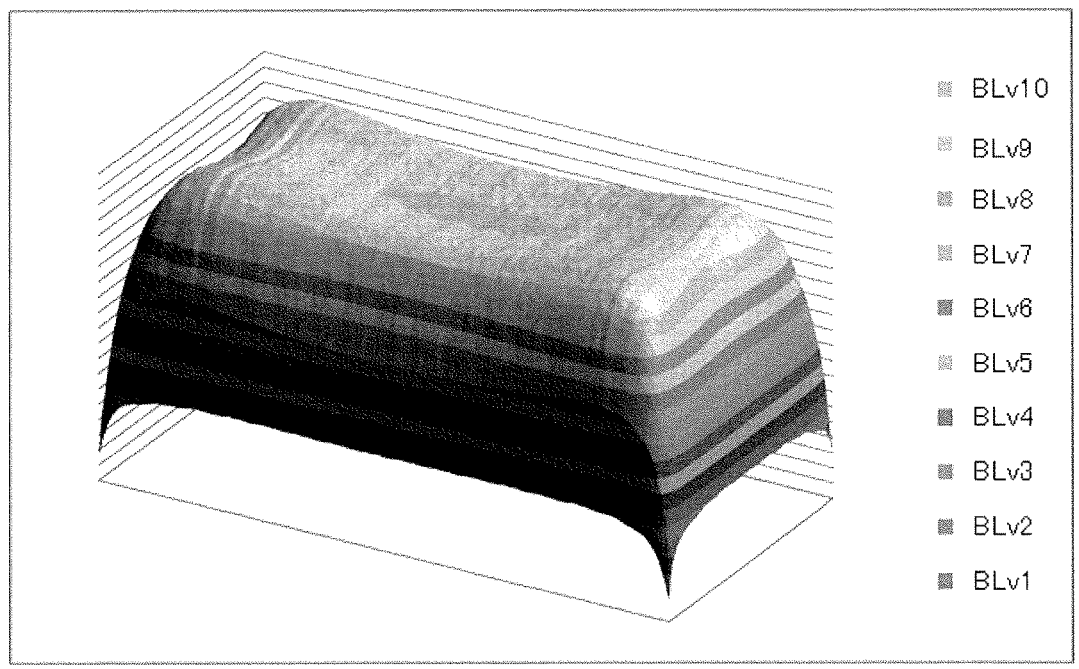

[ FIG. 10A ]
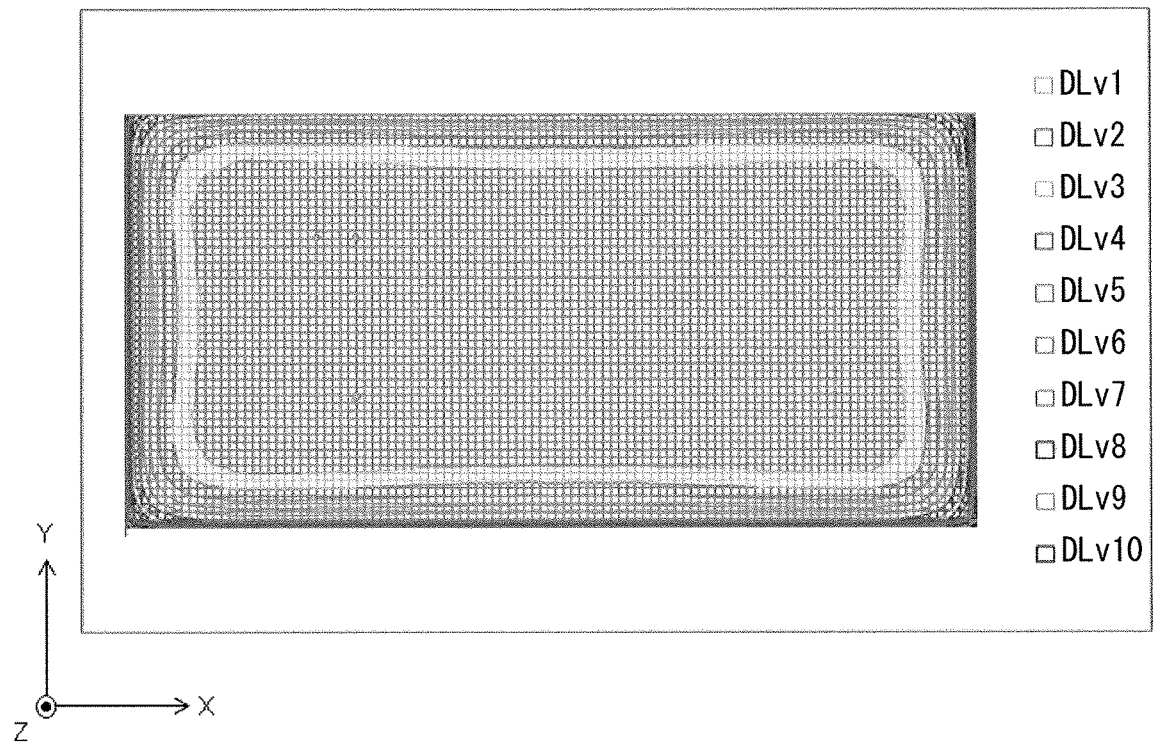
[ FIG. 10B ]
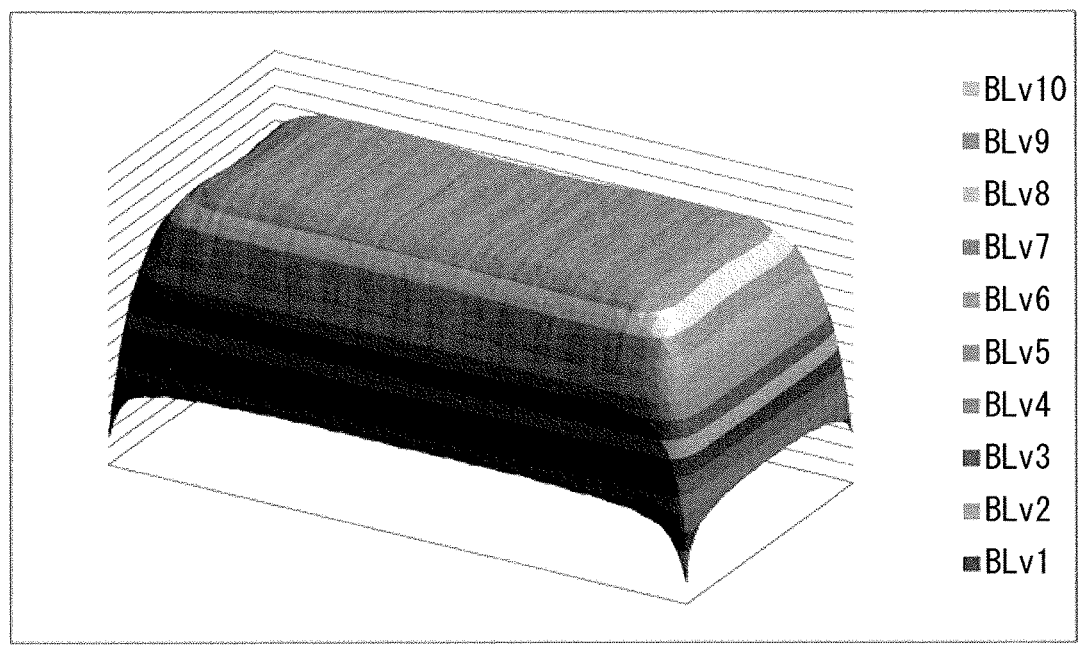

[ FIG. 11 ]
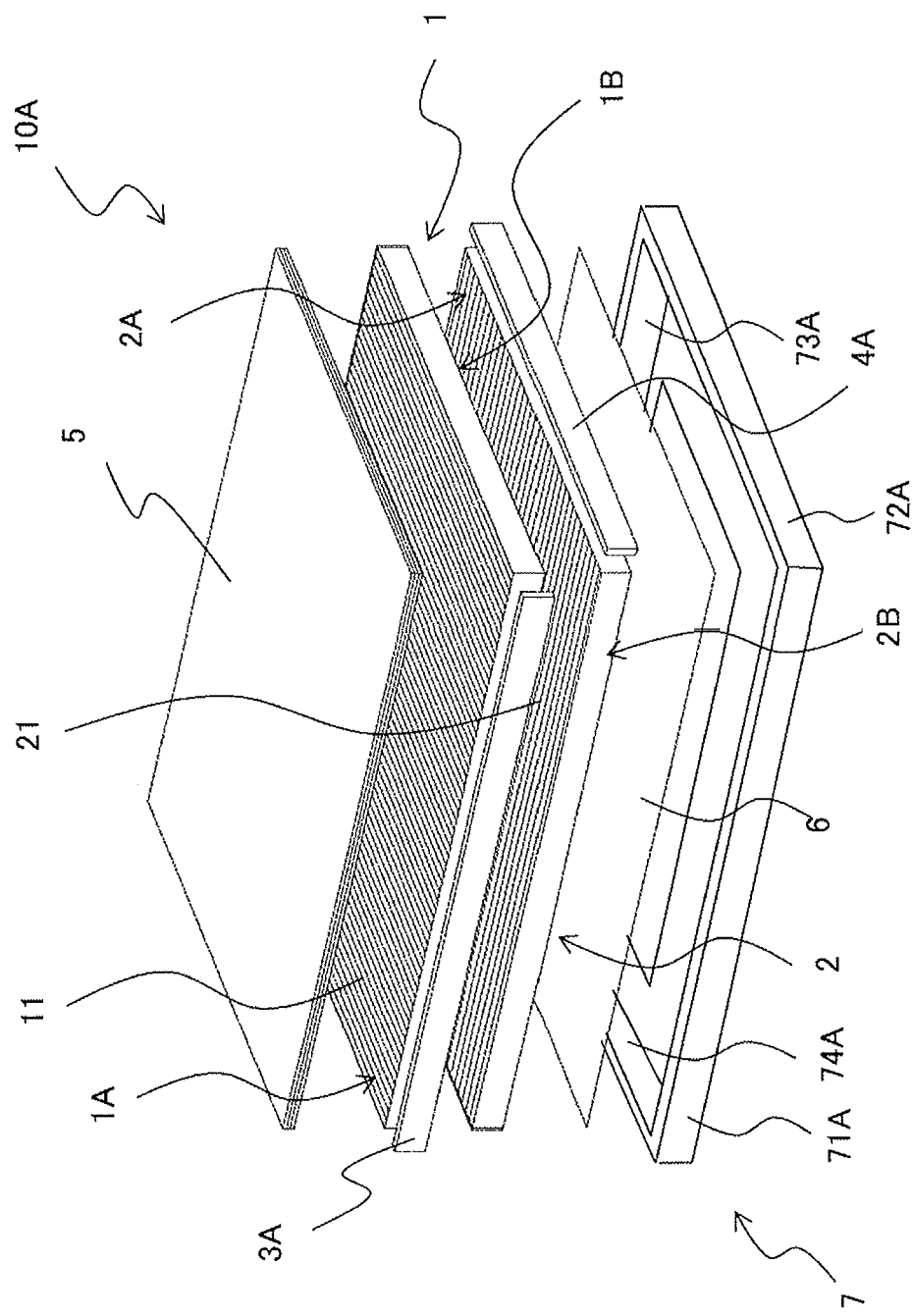

[ FIG. 12 ]
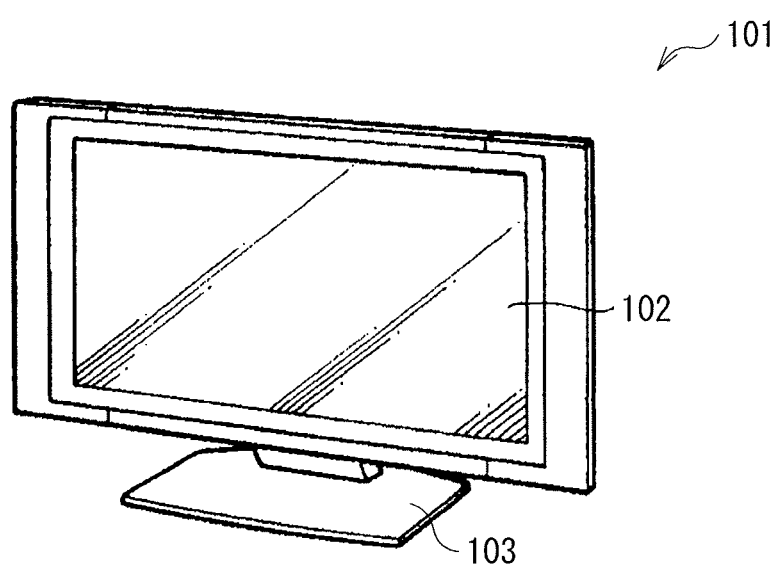

[FIG. 13]
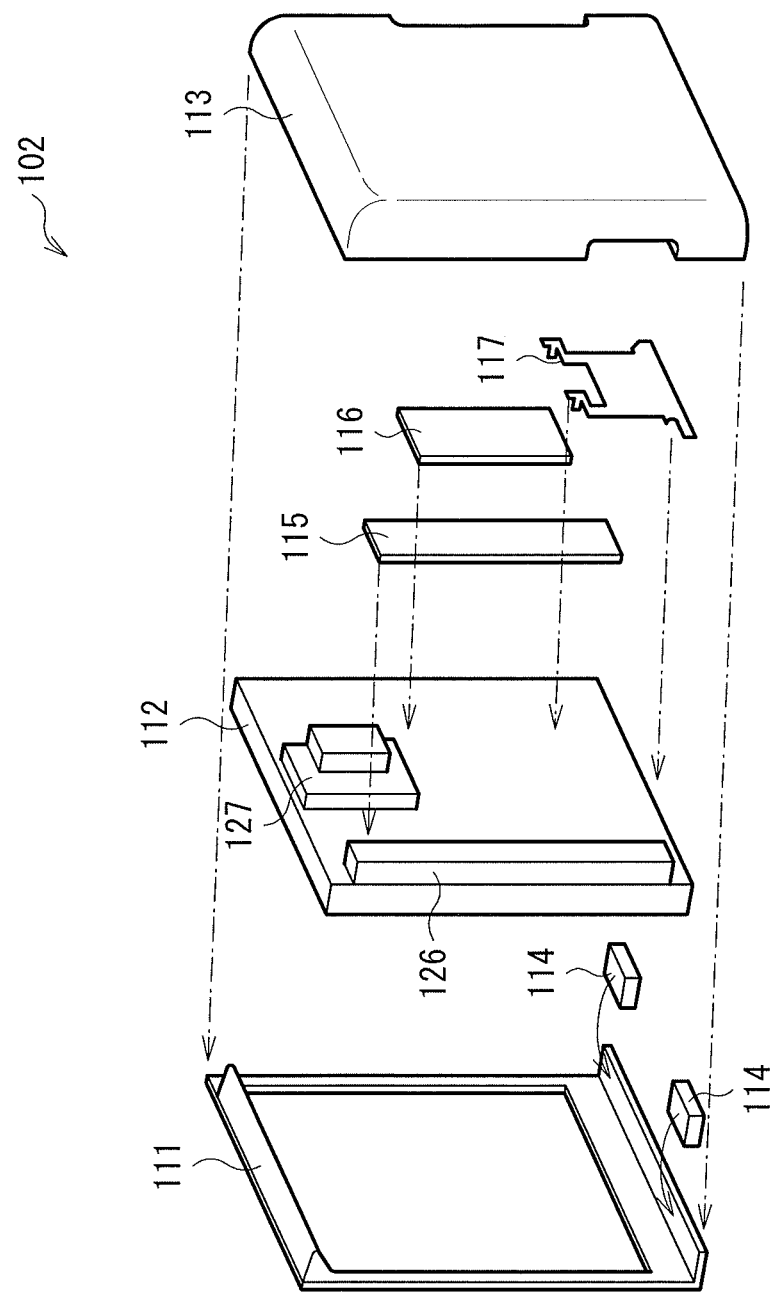

[FIG. 14]
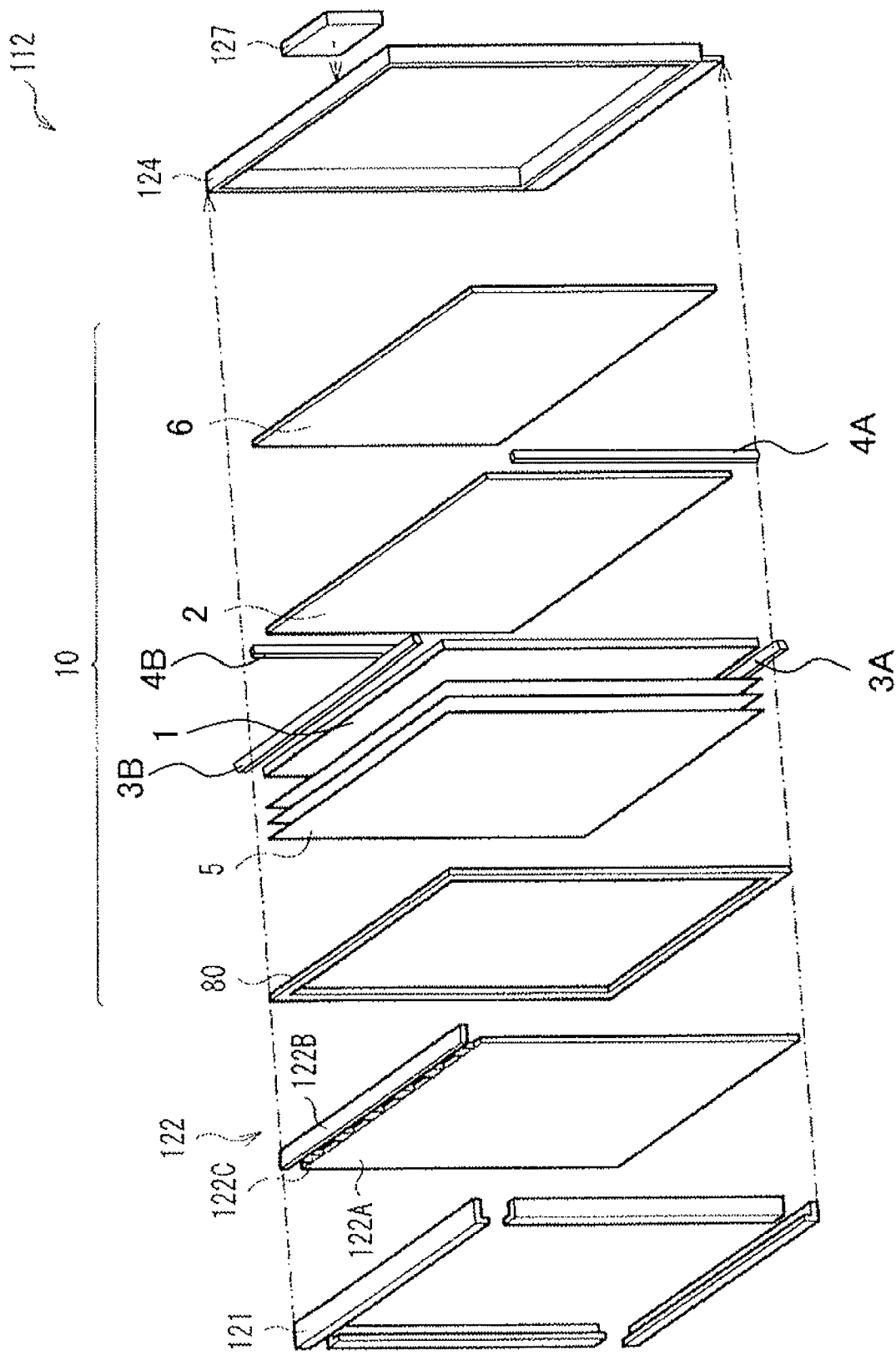

[ FIG. 15A ]
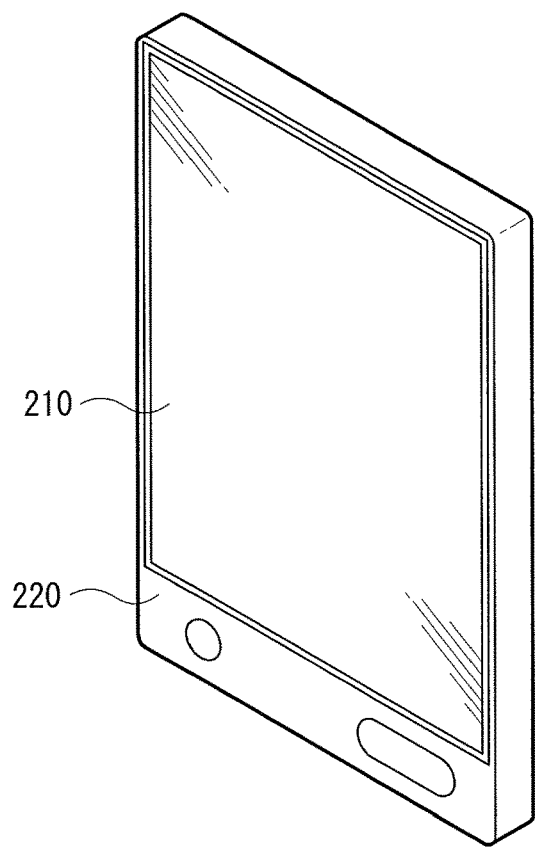
[ FIG. 15B ]
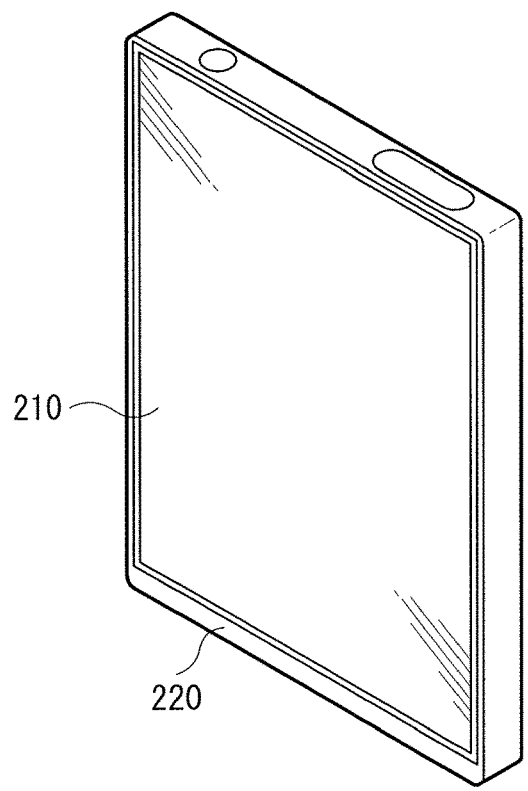

[ FIG. 16 ]
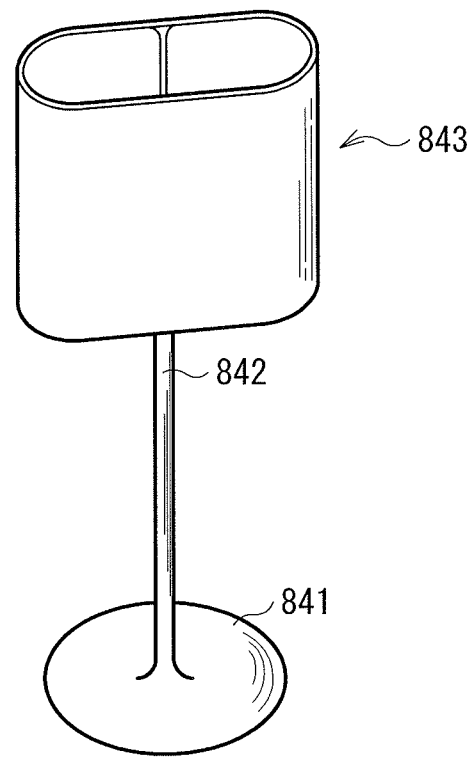
[ FIG. 17 ]
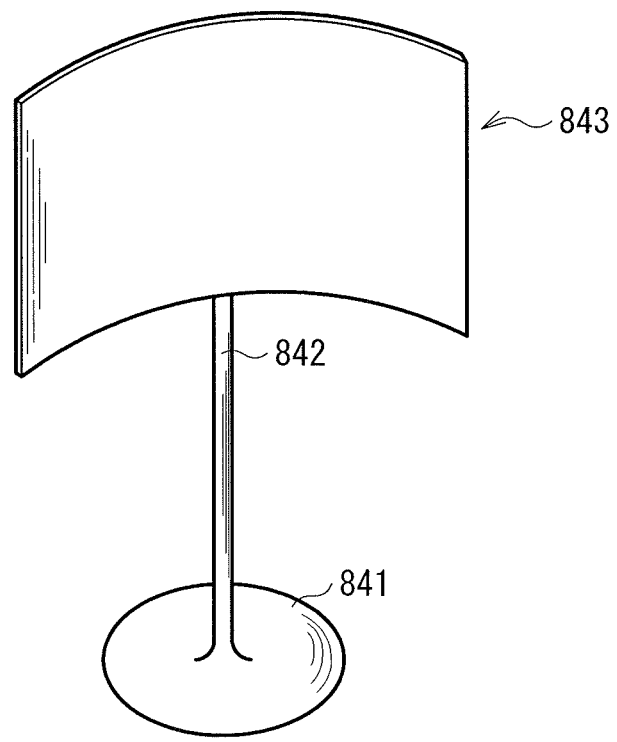

[ FIG. 18 ]
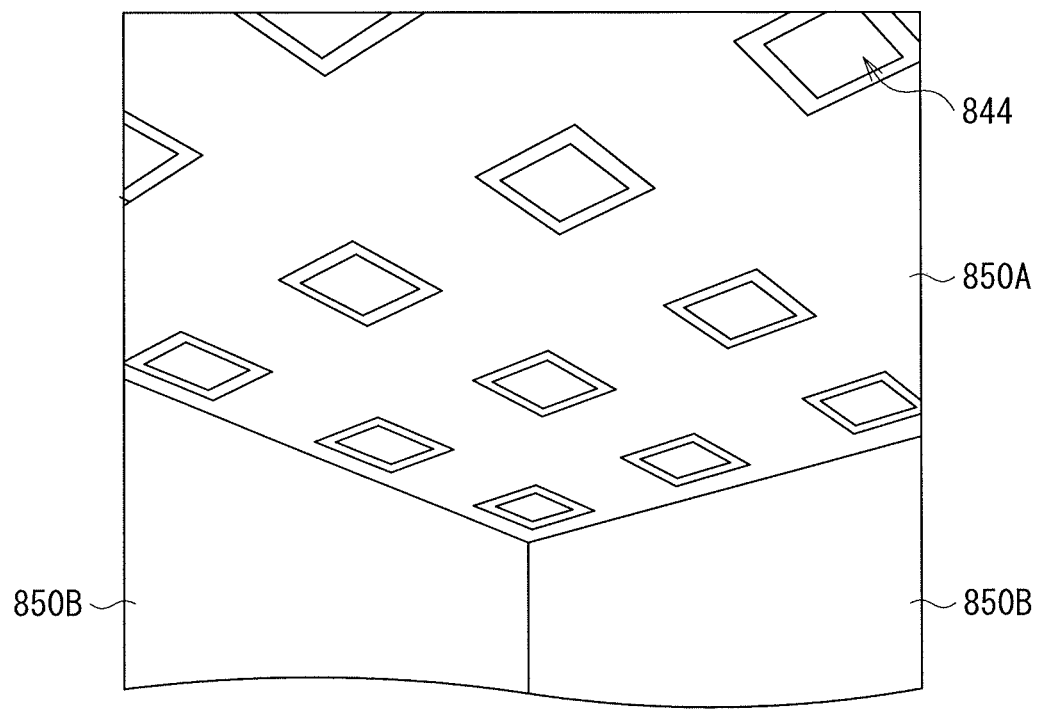

LIGHT-EMITTING UNIT, DISPLAY APPARATUS, AND LIGHTING APPARATUS

CROSS-REFERENCE TO RELATED APPLICATIONS

This application is a national phase entry under 35 U.S.C. § 371 of International Application No. PCT/JP2016/074108 filed Aug. 18, 2016, which claims the priority from Japanese Patent Application No. 2015-205598 filed in the Japanese Patent Office on Oct. 19, 2015, the entire contents of which are hereby incorporated by reference.

TECHNICAL FIELD

The disclosure relates to a light-emitting unit that is utilizable as a surface light source, and to a display apparatus and a lighting apparatus that include such a light-emitting unit therein.

BACKGROUND ART

To date, as a backlight to be mounted on a display apparatus such as a liquid crystal display apparatus, for example, or as a lighting apparatus, a so-called direct-type light-emitting unit has been used that includes a plurality of light sources arrayed on a substrate. Such a direct-type light-emitting unit makes it easy to achieve a contrast ratio of a bright section to a dark section inside a light-emitting surface.

Meanwhile, as the above-described backlight, a so-called edge-type light-emitting unit is also known that includes a light guide plate having a light-emitting surface, and a plurality of light sources disposed in the vicinity of an edge of the light guide plate to emit light into an end surface of the light guide plate (for example, see PTLs 1 and 2).

CITATION LIST

Patent Literature

PTL 1: Japanese Unexamined Patent Application Publication No. 2011-9208
PTL 2: Japanese Unexamined Patent Application Publication No. 2012-18308

SUMMARY OF THE INVENTION

Such an edge-type light-emitting unit is considered to be more suitable for reduction in thickness in comparison with the direct-type light-emitting unit. However, as of late, further improved quality such as improved resolution of displayed images, or an extended dynamic range of chromaticity and of luminosity has been desired.

Accordingly, it is desirable to provide a display apparatus having superior display performance. Further, it is desirable to provide a light-emitting unit having the superior light-emitting performance that is preferred for such a display apparatus. In addition, it is desirable to provide a lighting apparatus that includes the light-emitting unit having the above-described superior light-emitting performance.

A light-emitting unit according to an embodiment of the disclosure includes a plurality of first light-emitting sections, a first light guide plate, a plurality of second light-emitting sections, and a second light guide plate. The plurality of first light-emitting sections line up in a first direction, and emit first light individually. The first light guide plate includes a first end surface and a first front surface. The first light guide plate guides, along a second direction, a portion of the first light incoming from the first end surface, and outputs the guided portion of the first light from the first front surface. The first end surface extends along the first direction and faces the first light-emitting sections. The second direction is a direction getting away from the first end surface. The plurality of second light-emitting sections line up in a second direction, and emit second light individually. The second light guide plate includes a second end surface and a second front surface. The second light guide plate guides, along the first direction, a portion of the second light incoming from the second end surface, and outputs the guided portion of the second light from the second front surface. The second end surface extends along the second direction and faces the second light-emitting sections. The first light guide plate and the second light guide plate are laminated to cause the first front surface and the second front surface to be overlapped with each other. Further, a display apparatus and a lighting apparatus according to respective embodiments of the disclosure are each provided with the light-emitting unit described above.

In the light-emitting unit, the display apparatus, and the lighting apparatus according to the respective embodiments of the disclosure, the first light guide plate that causes the first light from the plurality of first light-emitting sections to propagate in the second direction to output the first light from the first front surface, and the second light guide plate that causes the second light from the plurality of second light-emitting sections to propagate in the first direction to output the second light from the second front surface are laminated. Therefore, by selectively turn on a portion or all of the plurality of first light-emitting sections, and a portion or all of the plurality of second light-emitting sections, a portion or a whole of the light-emitting surface emits light selectively.

According to the light-emitting unit of the embodiment of the disclosure, it is possible to control the luminance of any region in the light-emitting surface. Therefore, the light-emitting unit makes it possible to improve a contrast ratio of a bright section to a dark section in the light-emitting surface, and to exhibit superior light-emitting performance. Thus, according to the display apparatus using the light-emitting unit, it is possible to exhibit superior image expression. Further, according to the lighting apparatus using the light-emitting unit, it is possible to carry out more uniform illumination selectively onto an object. It is to be noted that the effects of the disclosure are not limited to the effects described above, and may be any of the effects that will be described herein.

BRIEF DESCRIPTION OF DRAWINGS

FIG. 1A is an exploded perspective view of an overall configuration example of a light-emitting unit according to a first embodiment in the disclosure.

FIG. 1B is a plan view of a configuration of a major part of the light-emitting unit illustrated in FIG. 1A.

FIG. 1C is an enlarged cross-sectional view of a first light guide plate illustrated in FIG. 1A.

FIG. 1D is a plan view of a configuration of a first light source unit illustrated in FIG. 1A.

FIG. 1E is a plan view of a configuration of a second light source unit illustrated in FIG. 1A.

FIG. 1F is an enlarged perspective view of another major part of the light-emitting unit illustrated in FIG. 1A.

FIG. 2 is a block diagram illustrating a simplified circuit configuration of the light-emitting unit illustrated in FIG. 1A.

FIG. 3A is a plan view of a detailed configuration of a frame illustrated in FIG. 1A.

FIG. 3B is a cross-sectional view of a partial configuration of the frame illustrated in FIG. 3A.

FIG. 3C is a cross-sectional view of another partial configuration of the frame illustrated in FIG. 3A.

FIG. 4 is an explanatory diagram illustrating a first operational state of the light-emitting unit illustrated in FIG. 1A.

FIG. 5A is a characteristic diagram illustrating an in-plane luminance distribution of a light-emitting surface that corresponds to the first operational state illustrated in FIG. 4.

FIG. 5B is another characteristic diagram illustrating the in-plane luminance distribution of the light-emitting surface that corresponds to the first operational state illustrated in FIG. 4.

FIG. 6 is an explanatory diagram illustrating a second operational state of the light-emitting unit illustrated in FIG. 1A.

FIG. 7A is a characteristic diagram illustrating an in-plane luminance distribution of the light-emitting surface that corresponds to the second operational state illustrated in FIG. 6.

FIG. 7B is another characteristic diagram illustrating the in-plane luminance distribution of the light-emitting surface that corresponds to the second operational state illustrated in FIG. 6.

FIG. 8A is a characteristic diagram illustrating a simulation result of a planar luminance distribution in output light only from the first light guide plate illustrated in FIG. 1A.

FIG. 8B is a characteristic diagram illustrating a simulation result of the luminance distribution of the output light only from the first light guide plate illustrated in FIG. 1A.

FIG. 9A is a characteristic diagram illustrating a simulation result of a planar luminance distribution in output light only from a second light guide plate illustrated in FIG. 1A.

FIG. 9B is a characteristic diagram illustrating a simulation result of the luminance distribution of the output light only from the second light guide plate illustrated in FIG. 1A.

FIG. 10A is a schematic diagram illustrating a luminance distribution of light that synthesizes scattering light illustrated in FIG. 8B with scattering light illustrated in FIG. 9B.

FIG. 10B is another schematic diagram illustrating the luminance distribution of the light that synthesizes the scattering light illustrated in FIG. 8B with the scattering light illustrated in FIG. 9B.

FIG. 11 is a perspective view of a first modification example of the light-emitting unit illustrated in FIG. 1A.

FIG. 12 is a perspective view of an external appearance of a display apparatus according to a second embodiment of the disclosure.

FIG. 13 is an exploded perspective view of a main body section illustrated in FIG. 12.

FIG. 14 is an exploded perspective view of a panel module illustrated in FIG. 13.

FIG. 15A is a perspective view of an external appearance of a tablet terminal apparatus mounted with a display apparatus of the disclosure.

FIG. 15B is a perspective view of an external appearance of another tablet terminal apparatus mounted with the display apparatus of the disclosure.

FIG. 16 is a perspective view of an external appearance of a first lighting apparatus that includes a light-emitting unit of the disclosure.

FIG. 17 is a perspective view of an external appearance of a second lighting apparatus that includes the light-emitting unit of the disclosure.

FIG. 18 is a perspective view of an external appearance of a third lighting apparatus that includes the light-emitting unit of the disclosure.

MODES FOR CARRYING OUT THE INVENTION

Hereinafter, embodiments of the disclosure are described in detail with reference to the drawings. It is to be noted that the description is given in the following order.
1. First Embodiment
  A light-emitting unit having a structure in which two light guide plates are laminated to be disposed that differ from each other in a light-guiding direction of entering light. (FIGS. 1A to 10B)
2. First Modification Example of First Embodiment
  A light-emitting unit having a structure in which the number of light source units is reduced (FIG. 11).
3. Second Embodiment
  A liquid crystal display apparatus (FIGS. 12 to 14).
4. Application Examples of Display Apparatus (FIGS. 15A and 15B)
5. Application Examples of Lighting Apparatus (FIGS. 16 to 18)

1. First Embodiment

[Configuration of Light-Emitting Unit 10]

FIG. 1A is a schematic perspective view of an overall configuration of a light-emitting unit 10 according to a first embodiment of the disclosure. FIG. 1B is an enlarged plan view of a major part of the light-emitting unit 10. FIG. 1C is an enlarged cross-sectional view of a cross-sectional configuration of a light guide plate 1 (2) in the light-emitting unit 10, which corresponds to a cross-sectional surface taken in the direction of an arrow along a line IC-IC illustrated in FIG. 1B. FIGS. 1D and 1E are plan views of configurations of light source units 3A and 3B as well as light source units 4A and 4B illustrated in FIG. 1A, respectively. Further, FIG. 1F is an enlarged perspective view of another major part of the light-emitting unit 10. The light-emitting unit 10 is used, for example, as a backlight that illuminates a transmissive liquid crystal panel using an X-Y plane as a light-emitting surface with light from behind, or as a lighting apparatus indoors or at any other place.

The light-emitting unit 10 has a light guide plate 1 and a light guide plate 2 that are disposed to lay on top of each other, light source units 3A and 3B that are disposed in the vicinity of the light guide plate 1, and light source units 4A and 4B that are disposed in the vicinity of the light guide plate 2. Further, the light-emitting unit 10 has an optical member 5 and a reflective member 6 that are provided with the light guide plate 1 and the light guide plate 2 interposed between. In addition, the light-emitting unit 10 has a frame 7 that contains and holds the light guide plate 1, the light guide plate 2, the light source units 3A and 3B, the light source units 4A and 4B, the optical member 5, and the reflective member 6.

(Light Guide Plate 1 and Light Guide Plate 2)

The light guide plate 1 is an approximately-cuboid plate-like member that includes a front surface 1A and a rear surface 1B which serve as a pair of principal surfaces facing in a front-back direction (a Z-axis direction) orthogonal to a light-emitting surface, as well as end surfaces 13A and 13B and side surfaces 14A and 14B that connect four sides of the front surface 1A and four sides of the rear surface 1B (see FIG. 1B). The end surface 13A and the end surface 13B are located at positions opposite to each other in a Y-axis direction, and the side surface 14A and the side surface 14B are located at positions opposite to each other in an X-axis direction. Here, the two end surfaces 13A and 13B function respectively as entrance surfaces that light from the light source units 3A and 3B enters. Further, the front surface 1A and the rear surface 1B in the light guide plate 1 function respectively as output surfaces from which the light incoming through the end surfaces 13A and 13B from the light source units 3A and 3B is emitted. Desirably, the front surface 1A and the rear surface 1B are parallel to each other.

The light guide plate 1 serves to guide the light that enters the end surfaces 13A and 13B from the light source units 3A and 3B to the front surface 1A, and mainly includes transparent thermoplastic resin such as polycarbonate resin (PC) or acrylic resin (for example, PMMA (polymethylmethacrylate)), for example. On the front surface 1A, to improve the straight-travelling performance of the light propagating across the light guide plate 1, for example, a convexoconcave pattern 11 is preferably provided that is configured in such a manner that a plurality of fine convex sections 11A extending in the Y-axis direction (see FIG. 1C) are disposed side by side in the X-axis direction. The convex section 11A is, for example, a cylindrical lens including a cylindrical surface extending in the Y-axis direction, and the convexoconcave pattern 11 is a lenticular lens in such a case. Meanwhile, on the rear surface 1B, as a scattering section that scatters and uniformizes the light propagating across the light guide plate 1, for example, a scattering structure 12 is provided that is configured in such a manner that a scattering agent is printed discretely. It is to be noted that the scattering structure 12 may be a structure provided with a region including a filler, or a structure with a surface roughened partially, instead of the pattern printing of the scattering agent.

With such a configuration, the light guide plate 1 functions to guide a portion of the light incoming through the end surface 13A from the light source unit 3A to get away from the end surface 13A along a +Y-direction, and to output, from the front surface 1A, the portion of the light incoming through the end surface 13A from the light source unit 3A. Further, the light guide plate 1 functions to guide, along a −Y-direction away from the end surface 13B, a portion of the light incoming through the end surface 13B from the light source unit 3B, and to output, from the front surface 1A, the portion of the light incoming through the end surface 13B from the light source unit 3B. At this time, the scattering structure 12 functions to scatter and uniformize the light propagating across the light guide plate 1.

The light guide plate 2 is an approximately-cuboid plate-like member that includes a front surface 2A and a rear surface 2B which serve as a pair of principal surfaces facing in the front-back direction (the Z-axis direction) orthogonal to the light-emitting surface, as well as side surfaces 23A and 23B and end surfaces 24A and 24B that connect four sides of the front surface 2A and four sides of the rear surface 2B (see FIG. 1B). The side surface 23A and the side surface 23B are located at positions opposite to each other in the Y-axis direction, and the end surface 24A and the end surface 24B are located at positions opposite to each other in the X-axis direction. Here, the two end surfaces 24A and 24B function respectively as entrance surfaces that light from the light source units 4A and 4B enters. Further, the front surface 2A and the rear surface 2B in the light guide plate 2 function respectively as output surfaces from which the light incoming through the end surfaces 24A and 24B from the light source units 4A and 4B is emitted. Desirably, the front surface 2A and the rear surface 2B are parallel to each other.

The light guide plate 2 serves to guide the light that enters the end surfaces 24A and 24B from the light source units 4A and 4B to the front surface 2A, and mainly includes transparent thermoplastic resin such as polycarbonate resin (PC) or acrylic resin (for example, PMMA (polymethylmethacrylate)), for example. On the front surface 2A, to improve the straight-travelling performance of the light propagating across the light guide plate 2, for example, a convexoconcave pattern 21 is preferably provided that is configured in such a manner that a plurality of fine convex sections 21A extending in the X-axis direction (see FIG. 1C) are disposed side by side in the Y-axis direction. The convex section 21A is, for example, a cylindrical lens including a cylindrical surface extending in the X-axis direction, and the convexoconcave pattern 21 is a lenticular lens in such a case. Meanwhile, on the rear surface 2B, as a scattering section that scatters and uniformizes the light propagating across the light guide plate 2, for example, a scattering structure 22 is provided that is configured in such a manner that a scattering agent is printed discretely. It is to be noted that the scattering structure 22 may be a structure provided with a region including a filler, or a structure with a surface roughened partially, instead of the pattern printing of the scattering agent.

With such a configuration, the light guide plate 2 functions to guide a portion of the light incoming through the end surface 24A from the light source unit 4A to get away from the end surface 24A along a −X-direction, and to output, from the front surface 2A, the portion of the light incoming through the end surface 24A from the light source unit 4A. Further, the light guide plate 2 functions to guide, along a +X-direction away from the end surface 24B, a portion of the light incoming through the end surface 24B from the light source unit 4B, and to output, from the front surface 2A, the portion of the light incoming through the end surface 24B from the light source unit 4B. At this time, the scattering structure 22 functions to scatter and uniformize the light propagating across the light guide plate 2.

The light guide plate 1 and the light guide plate 2 are laminated in such a manner that the front surface 1A and the front surface 2A are overlapped with each other (or the scattering structure 12 of the rear surface 1B and the scattering structure 22 of the rear surface 2B are overlapped with each other).

The luminance distribution of scattering light to be formed by the scattering structure 12 and the luminance distribution of scattering light to be formed by the scattering structure 22 may be the same as each other; however, may be different from each other. This is because it is possible to make a difference in the luminance distribution in the X-Y plane of light to be emitted from the light-emitting unit 10 between a case where only the light source units 3A and 3B are turned on, and a case where only the light source units 4A and 4B are turned on, for example. In a case where such a light-emitting unit 10 is mounted on, for example, a display apparatus, this will contribute to the wide array of image representation in the display apparatus. For example, considering a light guide plate having the luminance distribution illustrated in FIGS. 8A and 8B to be described later, in a case where the light-emitting unit 10 including such a light guide plate is used in a display apparatus, it is possible to brighten a middle region of a screen, thereby allowing for bringing it into clear view. Alternatively, considering a light guide plate having the luminance distribution illustrated in FIGS. 9A and 9B to be described later, in a case where the light-emitting unit 10 including such a light guide plate is used in a display apparatus, it is possible to brighten a peripheral region of a screen, thereby allowing for bringing it into clear view. Further, in a case where the above-described light guide plate having the luminance distribution illustrated in FIGS. 8A and 8B, and the above-described light guide plate having the luminance distribution illustrated in FIGS. 9A and 9B are laminated to make each of the light guide plates emit light, it is also possible to achieve the ideal and flat luminance distribution.

(Light Source Units 3A and 3B)

Each of the light source units 3A and 3B has a single light source substrate 31, and a plurality of light-emitting devices 32 (see FIG. 1D). The light source substrate 31 is a plate-like member extending in the X-axis direction in a state of facing the end surface 13A or 13B of the light guide plate 1. The plurality of light-emitting devices 32 are disposed to line up in the X-axis direction on a surface of the light source substrate 31, and each of them emits light toward the end surface 13A or 13B. The light-emitting device 32 is, for example, a point light source having an optical axis in a direction orthogonal to the end surface 13A or 13B (the Y-axis direction), and specifically includes an LED (Light Emitting Diode) that emits white light. A drive circuit 8 (illustrated in FIG. 2 to be described later, and not illustrated in FIG. 1D, etc.) that performs driving (turn-on and turn-off) of the respective light-emitting devices 32 is coupled to the light source substrate 31. The plurality of light-emitting devices 32 are assigned to any of a plurality of (for example, m-pieces of) light source blocks BX (BX1, BX2, ..., BXm−1, and BXm), and driving (turn-on and turn-off) is carried out by the drive circuit 8 for each of the light source blocks BX. It is to be noted that the light source substrates 31 in the light source units 3A and 3B are fixed to inner surfaces of wall sections 71A and 73A of the frame 7, respectively.

(Light Source Units 4A and 4B)

Each of the light source units 4A and 4B has a single light source substrate 41, and a plurality of light-emitting devices 42 (see FIG. 1E). The light source substrate 41 is a plate-like member extending in the Y-axis direction in a state of facing the end surfaces 24A and 24B of the light guide plate 2. The plurality of light-emitting devices 42 are disposed to line up in the Y-axis direction on a surface of the light source substrate 41, and each of them emits light toward the end surface 24A or 24B. The light-emitting device 42 is, for example, a point light source having an optical axis in a direction orthogonal to the end surface 24A or 24B (the X-axis direction), and specifically includes the LED that emits the white light. The drive circuit 8 (illustrated in FIG. 2, and not illustrated in FIG. 1E, etc.) that performs driving (turn-on and turn-off) of the respective light-emitting devices 42 is coupled to the light source substrate 41 as well. The plurality of light-emitting devices 42 are assigned to any of a plurality of (for example, n-pieces of) light source blocks BY (BY1, BY2, ..., BYn−1, and BYn), and driving (turn-on and turn-off) is carried out by the drive circuit 8 for each of the light source blocks BY. It is to be noted that the light source substrates 41 in the light source units 4A and 4B are fixed to inner surfaces of wall sections 72A and 74A of the frame 7, respectively.

As illustrated in FIG. 2, the drive circuit 8 is coupled to each of the plurality of (for example, m-pieces of) light source blocks BX (BX1, BX2, ..., BXm−1, and BXm) in the light source units 3A and 3B, and each of the plurality of (for example, n-pieces of) light source blocks BY (BY1, BY2, ..., BYn−1, and BYn) in the light source units 4A and 4B, and independently performs each operation of turning on and turning off the light source units 3A, 3B, 4A, and 4B. FIG. 2 is a block diagram illustrating a simplified circuit configuration of the light-emitting unit 10.

The optical member 5 is provided to face the front surface 1A of the light guide plate 1, and is configured by laminating, for example, a diffusing plate, a diffusing sheet, a lens film, a polarization split sheet, etc. Providing such an optical member 5 allows light emitted from each of the light guide plates 1 and 2 in an oblique direction to rise in a front direction, which makes it possible to further enhance the front luminance.

The reflective member 6 is a plate-like or sheet-like member that is provided to face the rear surface 2B of the light guide plate 2, and returns, back to the light guide plates 1 and 2, light leaking from the rear surface 1B after entering the light guide plate 1 from the light source units 3A and 3B, or light leaking from the rear surface 2B after entering the light guide plate 2 from the light source units 4A and 4B, respectively. The reflective member 6 has, for example, functions such as reflection, diffusion, or scattering, which makes it possible to efficiently utilize light from the light source units 3A and 3B, and the light source units 4A and 4B, thereby allowing the front luminance to be enhanced.

The reflective member 6 includes, for example, a foamed PET (polyethylene terephthalate), a silver-deposited film, a multi-layered reflective film, or a white PET. In a case where the reflective member 6 is given a fine shape, the reflective member 6 may be formed in an integrated manner utilizing a method such as thermal press molding with use of a thermoplastic resin, or melt extrusion, or may be formed in a manner of applying an energy-ray (for example, ultraviolet) curable resin onto a base material including, for example, the PET, and thereafter transcribing a shape onto the energy-ray curable resin. Here, examples of the thermoplastic resin include a polycarbonate resin, an acrylic resin such as a PMMA (polymethyl methacrylate resin), a polyester resin such as a polyethylene terephthalate, an amorphous copolymer polyester resin such as an MS (a copolymer of methyl methacrylate and styrene), a polystyrene resin, a polyvinyl chloride resin, etc. Further, in transcribing the shape onto the energy-ray (for example, ultraviolet) curable resin, the base material may be glass.

Here, as illustrated in FIG. 1B, a distance LY1 between the light source unit 3A and the end surface 13A of the light guide plate 1 in the Y-axis direction is desirably shorter than a distance LY2 between the light source unit 3A and the side surface 23A of the light guide plate 2 in the Y-axis direction (LY1<LY2). Further, a distance LY3 between the light source unit 3B and the end surface 13B of the light guide plate 1 in the Y-axis direction is desirably shorter than a distance LY4 between the light source unit 3B and the side surface 23B of the light guide plate 2 in the Y-axis direction (LY3<LY4). The smaller distances LY1 and LY3 make it possible to cause the light-emitting devices 32 to be closer to the end surfaces 13A and 13B of the light guide plate 1, which leads to the improved efficiency of light entrance into the light guide plate 1, thereby allowing for enhancement of the emission intensity from the front surface 1A. Meanwhile, the larger distances LY2 and LY4 make it possible to cause the light-emitting devices 32 to be away from the side surfaces 23A and 23B of the light guide plate 2, which makes it easy to avoid unintended ingress of leakage light into the light guide plate 2 from the light-emitting devices 32.

For the similar reason, a distance LX1 between the light source unit 4A and the end surface 24A of the light guide plate 2 in the X-axis direction is desirably shorter than a distance LX2 between the light source unit 4A and the side surface 14A of the light guide plate 1 in the X-axis direction (LX1<LX2). Further, a distance LX3 between the light source unit 4B and the end surface 24B of the light guide plate 2 in the X-axis direction is desirably shorter than a distance LX4 between the light source unit 4B and the side surface 14B of the light guide plate 1 in the X-axis direction (LX3 <LX4). The smaller distances LX1 and LX3 make it possible to cause the light-emitting devices 42 to be closer to the end surfaces 24A and 24B of the light guide plate 2, which leads to the improved efficiency of light entrance into the light guide plate 2, thereby allowing for enhancement of the emission intensity from the front surface 2A. Meanwhile, the larger distances LX2 and LX4 make it possible to cause the light-emitting devices 42 to be away from the side surfaces 14A and 14B of the light guide plate 1, which makes it easy to avoid unintended ingress of leakage light into the light guide plate 1 from the light-emitting devices 42.

For example, as illustrated in 3A, the frame 7 is a member that forms a circular pattern in such a manner that first to fourth sections 71 to 74 are joined in sequence, and has a rectangular outer edge including four corner sections. A constituent material of the frame 7 includes, for example, a material having the high heat dissipation efficiency, such as an aluminum material. The first to the fourth sections 71 to 74 have bottom sections 71B to 74B extending across the X-Y plane, and wall sections 71A to 74A that are provided in a manner of standing on the bottom sections 71B to 74B, respectively. The light source substrate 31 of the light source unit 3A is attached to the wall section 71A of the first section 71; the light source substrate 41 of the light source unit 4A is attached to the wall section 72A of the second section 72; the light source substrate 31 of the light source unit 3B is attached to the wall section 73A of the third section 73; and the light source substrate 41 of the light source unit 4B is attached to the wall section 74A of the fourth section 74. It is to be noted that an opening 7K may be provided at a middle part of the frame 7. Here, a thickness T1 of each of the four corner sections CR1 to CR4 in the bottom sections 71B to 74B of the frame 7 is greater than a thickness T2 of each of portions other than the four corner sections CR1 to CR4 in the bottom sections 71B to 74B of the frame 7 (see FIGS. 3B and 3C). Such a configuration makes it possible to improve the heat dissipation performance of the four corner sections CR1 to CR4 on which heat generated in the light source units 3A, 3B, 4A, and 4B concentrates, and to avoid overheating of the light-emitting unit 10. It is to be noted that FIG. 3B is a cross-sectional view in the direction of an arrow along a line IIIB-IIIB illustrated in FIG. 3A, and FIG. 3C is a cross-sectional view in the direction of an arrow along a line IIIC-IIIC illustrated in FIG. 3A.

[Workings and Effects of Light-Emitting Unit 10]

As described above, in the light-emitting unit 10, the light guide plate 1 that guides, toward the Y-axis direction, light incoming through the end surface 13A from the one or more light-emitting devices 32, to output the guided light from the front surface 1A, and the light guide plate 2 that guides, toward the X-axis direction, light incoming through the end surface 24A from the one or more light-emitting devices 42, to output the guided light from the front surface 2A are disposed to lay on top of each other. The plurality of light-emitting devices 32 that line up in the X-axis direction to face the end surfaces 13A and 13B are disposed in the light source units 3A and 3B, and the plurality of light-emitting devices 42 that line up in the Y-axis direction to face the end surfaces 24A and 24B are disposed in the light source units 4A and 4B. Therefore, in the light-emitting unit 10, by selectively turning on a portion of the plurality of light-emitting devices 32 and a portion of the plurality of light-emitting devices 42, light emission is performed only for a partial region of the light-emitting surface extending across the X-Y plane (to be exact, it is possible to make the luminance of output light from a partial region higher than the luminance of output light from the peripheral region). Alternatively, by turning on all of the light-emitting devices 32, and by turning on all of the light-emitting devices 42, it is also possible to carry out the whole-surface light emission. It is to be noted that only one of the light guide plate 1 and the light guide plate 2 may be used (may be put in a light-emitting state).

More specifically, in the light-emitting unit 10, by turning on any of the light source blocks in any timing, using the drive circuit 8, it is possible to selectively enhance the luminance of any region in the light-emitting surface extending in the X-Y plane. In other words, it is possible to perform light emission in any timing for any one or more regions AR (m, n) that are selected from among the plurality of regions AR (m, n) disposed in a matrix array in FIG. 4, for example.

FIG. 4 is an explanatory diagram illustrating a certain operational state of the light-emitting unit 10. FIG. 4 illustrates an example where the light-emitting surface of the light-emitting unit 10 that extends in the X-Y plane is divided into eight regions in the X-axis direction, and is divided into four regions in the Y-axis direction. In other words, each of the plurality of light-emitting devices 32 in the light source units 3A and 3B is assigned to the eight light source blocks BX (BX1 to BX8), and each of the plurality of light-emitting devices 42 in the light source units 4A and 4B is assigned to the four light source blocks BY (BY1 to BY4). This makes it possible to divide the light-emitting surface of the light-emitting unit 10 into 32 (=8×4) regions AR (m, n), and to perform light emission individually for each of the regions AR m, n. For example, in FIG. 4, the light-emitting devices 32 belonging to the light source block BX4 in the light source unit 3B are turned on, and the light-emitting devices 42 belonging to the light source block BY2 in the light source unit 4B are turned on.

As a result, the region AR (4, 2) emits light with the higher luminance in comparison with the peripheral regions AR thereof, as illustrated in FIGS. 5A and 5B. In other words, a state where the luminance peak of output light from the light-emitting unit 10 exists in the region AR (4, 2) is observed. It is to be noted that FIG. 5A is a characteristic diagram illustrating the in-plane luminance distribution of the light-emitting surface that corresponds to the operational state illustrated in FIG. 4, and illustrates a state viewed from the Z-axis direction. As with the case of FIG. 5A, FIG. 5B is also a characteristic diagram (a simulation result) illustrating the in-plane luminance distribution of the light-emitting surface that corresponds to the operational state illustrated in FIG. 4; however, illustrates a state viewed from an oblique direction. In FIGS. 5A and 5B, the higher values indicate the higher luminance. However, in the examples in FIG. 4, as well as FIGS. 5A and 5B, light is caused to enter from only one side in each of the X-axis direction and the Y-axis direction. In other words, light of the light-emitting devices 32 is caused to enter from only the end surface 13B of the end surface 13A and the end surface 13B of the light guide plate 1, and light of the light-emitting devices 42 is caused to enter from only the end surface 24B of the end surface 24A and the end surface 24B of the light guide plate 2. This causes some bias (asymmetric property) in the in-plane luminance distribution of the light-emitting surface. That is, for example, the luminance of a region AR (1, 2), a region AR (2, 2), and a region AR (3, 2) between the end surface 24B and the region AR (4, 2) in the X-axis direction becomes higher than the luminance of a region AR (5, 2), a region AR (6, 2), a region AR (7, 2), and a region AR (8, 2) between the region AR (4, 2) and the end surface 24A.

In contrast, for example, as illustrated in FIG. 6, preferably, the light of the light-emitting devices 32 enters the light guide plate 1 from both of the end surface 13A and the end surface 13B, and the light of the light-emitting devices 42 enters the light guide plate 2 from both of the end surface 24A and the end surface 24B. With such a configuration, for example, as illustrated in FIGS. 7A and 7B, a bias of the in-plane luminance distribution of the light-emitting surface is made more moderate, resulting in the improved symmetry of the luminance distribution. Further, the light of twice as much as normal amount of light enters the region AR (4, 2) from the light-emitting devices 32 and 42, and therefore the intensity of output light from the region AR (4, 2) is also improved as compared with cases in FIGS. 5A and 5B. It is to be noted that the values in FIGS. 7A and 7B are specified on the basis of criteria similar to those in FIGS. 5A and 5B, and therefore, means the higher values indicate the higher luminance.

As described above, according to the light-emitting unit 10, by performing selective turn-on operation (partial driving) for each of the light source blocks BX and BY through the drive circuit 8, it is possible to control the luminance of any of regions AR (m, n) among the plurality of regions AR (m, n) that are divided in a matrix pattern in the light-emitting surface. Therefore, in spite of the so-called edge-type light-emitting unit, the light-emitting unit 10 makes it possible to improve a contrast ratio of a bright section to a dark section in the light-emitting surface, thereby allowing superior light-emitting performance to be exhibited.

Further, in the light-emitting unit 10, the scattering structures 12 and 22 are provided on the rear surface 1B of the light guide plate 1 and the rear surface 2B of the light guide plate 2, respectively, and the scattering structure 12 and the scattering structure 22 are overlapped with each other. Thus, for example, by adjusting a printing pattern of a scattering agent in the scattering structure 12 and a printing pattern of a scattering agent in the scattering structure 22 as appropriate, it is possible to change the luminance distribution of output light to be emitted from the light guide plate 1 and the light guide plate 2 as appropriate.

For example, FIGS. 8A and 8B illustrate examples of the scattering structure 12 that includes a printing pattern in which the in-plane density of dots in the scattering agent is the highest in a middle region of the light-emitting surface, and becomes lower toward a circumferential region of the light-emitting surface. In this case, if all of the light-emitting devices 32 are turned on, the luminance distribution is achieved in which the luminance level is the highest in the middle region where the in-plane density of the printed dots in the scattering agent is high (BLv10), and the luminance level becomes lower toward the circumferential region of the light-emitting surface (BLv9 to BLv1), as illustrated in FIGS. 8A and 8B. It is to be noted that FIGS. 8A and 8B are simulation results illustrating the luminance distribution of the output light from only the light guide plate 1.

In contrast, FIGS. 9A and 9B illustrate examples of the scattering structure 22 that includes a printing pattern in which the in-plane density of dots in the scattering agent is the highest in a region near four corners of the light-emitting surface, and becomes lower toward the middle region of the light-emitting surface. In this case, if all of the light-emitting devices 42 are turned on, the luminance distribution is achieved in which the luminance level is the highest in the region near the four corners where the in-plane density of the printed dots in the scattering agent is high (BLv10), and the luminance level becomes slightly lower toward the middle region of the light-emitting surface (BLv9 to BLv8), as illustrated in FIGS. 9A and 9B. It is to be noted that FIGS. 9A and 9B are simulation results illustrating the luminance distribution of the output light from only the light guide plate 2.

The luminance distribution (at the time of whole-surface light emission) of the overall light-emitting unit 10 in which the light guide plate 1 having the scattering structure 12 illustrated in FIG. 8A and the light guide plate 2 having the scattering structure 22 illustrated in FIG. 9A are disposed to lay on top of each other exhibits the higher flatness, as illustrated in FIGS. 10A and 10B.

As described above, in the light-emitting unit 10, if the whole-surface light emission is performed only for the light guide plate 1 having the scattering structure 12 illustrated in FIG. 8A, the luminance distribution illustrated in FIG. 8B is achieved. If the whole-surface light emission is performed only for the light guide plate 2 having the scattering structure 22 illustrated in FIG. 9A, the luminance distribution illustrated in FIG. 9B is achieved. Further, if the whole-surface light emission is performed for both of the light guide plate 1 and the light guide plate 2, the luminance distribution illustrated in FIGS. 10A and 10B is achieved. Here, by adjusting the respective printing patterns of the scattering structures 12 and 22 as appropriate, it is possible to form a variety of luminance distributions. In a case where such a light-emitting unit 10 is mounted on, for example, a display apparatus, the wide array of image representation in the display apparatus is achieved. Further, according to the lighting apparatus using the light-emitting unit 10, this makes it possible to carry out more uniform lighting selectively to objects.

2. First Modification Example of First Embodiment

[Configuration, Workings and Effects of Light-Emitting Unit 10A]

In the above-described embodiment, a pair of the light source units 3A and 3B are provided with the light guide plate 1 interposed between in the Y-axis direction, and a pair of the light source units 4A and 4B are provided with the light guide plate 2 interposed between in the X-axis direction. Even if the light-emitting surface is larger-sized, this makes it possible to adjust the luminance of the respective regions AR over the whole light-emitting surface. In contrast, the present modification example is a light-emitting unit 10A having a comparatively small-sized light-emitting surface. As illustrated in FIG. 11, in the light-emitting unit 10A, only the single light source unit 3A is provided for the light guide plate 1, and only the single light source unit 4A is provided for the light guide plate 2. Even in such a case, it is possible to adjust the luminance of the respective regions AR over the whole light-emitting surface. However, to make more moderate the asymmetric property in a top-bottom direction and a left-right direction, preferably, the in-plane density of the dots in the printing patterns that form the scattering structures 12 and 22 is adjusted. In other words, the in-plane density of the dots in the region AR far away from each of the light source units 3A and 4A may be gradually made higher with distance than the in-plane density of the dots in the region AR close to each of the light source units 3A and 4A.

3. Second Embodiment

FIG. 12 illustrates an external appearance of a display apparatus 101 according to a second embodiment of the technology. The display apparatus 101 includes the light-emitting unit 10, and is used as, for example, a flat-screen television apparatus. The display apparatus 101 has a configuration in which a flat plate-like main body section 102 for image display is supported by a stand 103. It is to be noted that the display apparatus 101 is used as a stationary type that is placed on a horizontal plane such as a floor, shelf, or table with the stand 103 attached to the main body section 102. However, the display apparatus 101 is also usable as a wall-hanging type with the stand 103 detached from the main body section 102.

FIG. 13 illustrates an exploded view of the main body section 102 illustrated in FIG. 12. The main body section 102 has, for example, a front exterior member (bezel) 111, a panel module 112, and a rear exterior member (rear cover) 113 in this order from the front side (viewer side). The front exterior member 111 is a frame-shaped member that covers a front circumferential portion of the panel module 112, and a pair of speakers 114 are disposed at a lower part thereof. The panel module 112 is fixed to the front exterior member 111, and a power supply substrate 115 and a signal substrate 116 are mounted, and a mounting fixture 117 is fixed on a rear surface thereof. The mounting fixture 117 serves to mount a wall-mounting bracket, substrates, etc., and the stand 103. The rear exterior member 113 covers the rear surface and side surfaces of the panel module 112.

FIG. 14 illustrates an exploded view of the panel module 112 illustrated in FIG. 13. The panel module 112 has, for example, a front housing (a top chassis) 121, a liquid crystal panel 122, a frame-shaped member (a middle chassis) 80, the optical member 5, the light guide plate 1, the light guide plate 2, the light source unit 3A, the light source unit 3B, the light source unit 4A, the light source unit 4B, the reflective member 6, the drive circuit 8 (not illustrated), a rear housing (a back chassis) 124, and a timing controller substrate 127 in this order from the front side (viewer side).

The front housing 121 is a frame-shaped metallic component that covers a front circumferential portion of the liquid crystal panel 122. The liquid crystal panel 122 has, for example, a liquid crystal cell 122A, a source substrate 122B, and a flexible substrate 122C such as a COF (Chip On Film) that couples these component parts. The frame-shaped member 80 is a frame-like resin-made component that holds the liquid crystal panel 122 and the optical member 5. The rear housing 124 is a metallic component including iron (Fe), aluminum, etc. that contains the liquid crystal panel 122, the frame-shaped member 80, and the light-emitting unit 10. The timing controller substrate 127 is also mounted on a rear surface of the rear housing 124.

In the display apparatus 101, image display is carried out in such a manner that the light from the light-emitting unit 10 is transmitted selectively by the liquid crystal panel 122. Here, the display apparatus 101 includes the light-emitting unit 10 that achieves improvement in the controllability of the in-plane luminance distribution as described in the first embodiment, leading to improvement in the display quality of the display apparatus 101. It is to be noted that the light-emitting unit 10A may be mounted on the display apparatus 101.

4. Application Examples of Display Apparatus

Hereinafter, the description is provided on examples of application of the display apparatus 101 as mentioned above to electronic apparatuses. Examples of the electronic apparatuses include a television apparatus, a digital camera, a notebook personal computer, a mobile terminal apparatus such as a mobile phone, a video camera, etc. In other words, the above-described display apparatus is applicable to electronic apparatuses in every field that display image signals inputted externally or internally generated image signals as images or video pictures.

FIG. 15A illustrates an external appearance of a tablet terminal apparatus to which the display apparatus 101 of the above-described embodiment is applicable. FIG. 15B illustrates an external appearance of another tablet terminal apparatus to which the display apparatus 101 of the above-described embodiment is applicable. Any of these tablet terminal apparatuses has, for example, a display section 210 and a non-display section 220, and the display section 210 is configured with use of the display apparatus 101 of the above-described embodiment.

5. Application Examples of Lighting Apparatus

Each of FIGS. 16 and 17 illustrates an external appearance of a tabletop lighting apparatus to which any of the light-emitting units 10 and 10A of the above-described embodiment is applicable. Any of these lighting apparatuses includes, for example, a lighting section 843 attached to a support post 842 that is provided on a base 841, and the lighting section 843 is configured with use of any of the light-emitting units 10 and 10A according to the above-described first embodiment. The lighting section 843 makes it possible to take any shape such as a tubular shape illustrated in FIG. 16, or a curved surface shape illustrated in FIG. 17 by configuring the light guide plates 1 and 2, the optical member 5, the reflective member 6, etc. in curviform shapes.

FIG. 18 illustrates an external appearance of an indoor lighting apparatus to which any of the light-emitting units 10 and 10A of the above-described embodiment is applicable. The lighting apparatus has a lighting section 844 that is configured with use of any of the light-emitting units 10 and 10A according to the above-described embodiment, for example. The appropriate number of the lighting sections 844 is disposed at appropriate spacing intervals on a ceiling 850A of a building. It is to be noted that the lighting section 844 is allowed to be installed not only on the ceiling 850A, but also on a wall 850B or a floor (not illustrated) depending on the intended use.

In these lighting apparatuses, illumination is performed through the light from the light-emitting unit 10. Here, the lighting apparatuses include the light-emitting unit 10 that improves the uniformity of the in-plane luminance distribution, leading to improvement of the illumination quality.

The disclosure is described thus far with reference to the embodiments, the modification example, and experimental examples thereof; however, the disclosure is not limited to the above-described embodiments, etc., and various modifications may be made. For example, the order of lamination of the light guide plate 1 and the light guide plate 2 may be inverse to the order illustrated in FIG. 1A, etc.

Further, dimensions, dimension ratios, and shapes of the respective component parts illustrated in each diagram are represented as one example, and the disclosure is not limited thereto.

Moreover, for example, in the above-described embodiments, the description is provided of a case where the light-emitting devices 32 and 42 are LEDs; however, the light-emitting devices 32 and 42 may be alternatively configured with use of a semiconductor laser, etc.

Moreover, for example, in the above-described embodiments, etc., the description is provided by citing, as a specific example, configurations of the light-emitting unit 10 and the display apparatus 101 (the television apparatus); however, it is unnecessary to provide all of the component parts, or any other component parts may be provided.

It is to be noted that the effects described herein are merely exemplified and non-limiting, and the effects of the disclosure may further include other effects. Further, the disclosure may be configured as follows.

(1)

A light-emitting unit including:

a plurality of first light-emitting sections that line up in a first direction, and emit first light individually;

a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction getting away from the first end surface;

a plurality of second light-emitting sections that line up in a second direction, and emit second light individually; and a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, in which the first light guide plate and the second light guide plate are laminated to cause the first front surface and the second front surface to be overlapped with each other.

(2)

The light-emitting unit according to (1), in which the first light guide plate further includes a first rear surface, the first rear surface facing the first front surface, and having a first scattering structure in which another portion of the first light is scattered, the second light guide plate further includes a second rear surface, the second rear surface facing the second front surface, and having a second scattering structure in which another portion of the second light is scattered, and the first light guide plate and the second light guide plate are laminated to cause the first scattering structure and the second scattering structure to be overlapped with each other.

(3)

The light-emitting unit according to (2), in which a luminance distribution of first scattered light that is provided by the first scattering structure and a luminance distribution of second scattered light that is formed by the second scattering structure are different from each other.

(4)

The light-emitting unit according to any one of (1) to (3), further including a drive circuit that performs turn-on and turn-off of the first light-emitting sections independently of turn-on and turn-off of the second light-emitting sections.

(5)

The light-emitting unit according to any one of (1) to (4), further including a plurality of third light-emitting sections that line up in the first direction, and emit third light individually, in which the first light guide plate further includes a third end surface that is located on opposite side of the first end surface and faces the third light-emitting sections, and the first light guide plate guides, along the second direction, a portion of the third light incoming from the third end surface, and outputs the guided portion of the third light from the first front surface.

(6)

The light-emitting unit according to (5), further including a plurality of fourth light-emitting sections that line up in the second direction, and emit fourth light individually, in which the second light guide plate further includes a fourth end surface that is located on opposite side of the second end surface and faces the fourth light-emitting sections, and the second light guide plate guides, along the first direction, a portion of the fourth light incoming from the fourth end surface, and outputs the guided portion of the fourth light from the second front surface.

(7)

The light-emitting unit according to (6), in which the first light guide plate further includes a first rear surface, the first rear surface facing the first front surface, and having a first scattering structure in which another portion of the first light and another portion of the third light are scattered, the second light guide plate further includes a second rear surface, the second rear surface facing the second front surface, and having a second scattering structure in which another portion of the second light and another portion of the fourth light are scattered, and the first light guide plate and the second light guide plate are laminated to cause the first scattering structure and the second scattering structure to be overlapped with each other.

(8)

The light-emitting unit according to (7), in which a luminance distribution of first scattered light that is provided by the first scattering structure and a luminance distribution of second scattered light that is provided by the second scattering structure are different from each other.

(9)

The light-emitting unit according to any one of (6) to (8), further including a drive circuit that independently performs turn-on and turn-off of the first to fourth light-emitting sections.

(10)

The light-emitting unit according to (2), further including a light scattering member disposed to face the first front surface.

(11)

The light-emitting unit according to (10), further including a light reflective member disposed to face the second rear surface.

(12)

The light-emitting unit according to any one of (1) to (11), in which the first front surface is provided with a plurality of first cylindrical lenses that line up in the first direction, the plurality of first cylindrical lenses each including a first cylindrical surface extending in the second direction, and the second front surface is provided with a plurality of second cylindrical lenses that line up in the second direction, the plurality of second cylindrical lenses each including a second cylindrical surface extending in the first direction.

(13)

The light-emitting unit according to any one of (6) to (13), in which a first distance is shorter than a second distance, the first distance being a distance between the first light-emitting section and the first light guide plate in the second direction, the second distance being a distance between the first light-emitting section and the second light guide plate in the second direction, a third distance is shorter than a fourth distance, the third distance being a distance between the third light-emitting section and the first light guide plate in the second direction, the fourth distance being a distance between the third light-emitting section and the second light guide plate in the second direction, a fifth distance is shorter than a sixth distance, the fifth distance being a distance between the second light-emitting section and the second light guide plate in the first direction, the sixth distance being a distance between the second light-emitting section and the first light guide plate in the first direction, and a seventh distance is shorter than an eighth distance, the seventh distance being a distance between the fourth light-emitting section and the second light guide plate in the first direction, the eighth distance being a distance between the fourth light-emitting section and the first light guide plate in the first direction.

(14)

The light-emitting unit according to any one of (1) to (13), further including a frame that includes a first portion to which the first light-emitting sections are attached, a second portion to which the second light-emitting sections are attached, a third portion to which the third light-emitting sections are attached, and a fourth portion to which the fourth light-emitting sections are attached, the first to fourth portions being joined to each other in order to provide a rectangular shape having four corner sections, in which a thickness of the corner section in the frame is greater than a thickness of a portion, of the frame, other than the corner sections.

(15)

A display apparatus provided with a liquid crystal panel and a light-emitting unit, the light-emitting unit being disposed on rear side of the liquid crystal panel, the light-emitting unit including:

a plurality of first light-emitting sections that line up in a first direction, and emit first light individually;

a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction getting away from the first end surface;

a plurality of second light-emitting sections that line up in a second direction, and emit second light individually; and a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, in which the first light guide plate and the second light guide plate are laminated to cause the first front surface and the second front surface to be overlapped with each other.

(16)

A lighting apparatus provided with a light-emitting unit, the light-emitting unit including:

a plurality of first light-emitting sections that line up in a first direction, and emit first light individually;

a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction getting away from the first end surface;

a plurality of second light-emitting sections that line up in a second direction, and emit second light individually; and a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, in which the first light guide plate and the second light guide plate are laminated to cause the first front surface and the second front surface to be overlapped with each other.

This application claims the priority on the basis of Japanese Patent Application No. 2015-205598 filed on Oct. 19, 2015 with Japan Patent Office, the entire contents of which are incorporated in this application by reference.

Those skilled in the art could assume various modifications, combinations, subcombinations, and changes in accordance with design requirements and other contributing factors. However, it is understood that they are included within a scope of the attached claims or the equivalents thereof.

The invention claimed is:

1. A light-emitting unit comprising:
a plurality of first light-emitting sections that line up in a first direction, and emit first light individually;
a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction extending away from the first end surface;
a plurality of second light-emitting sections that line up in the second direction, and emit second light individually; and
a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, wherein the first light guide plate and the second light guide plate are laminated to cause the first front surface and the second front surface to be overlapped with each other, and a first distance is shorter than a second distance, the first distance being a distance between the first light-emitting section and the first light guide plate in the second direction, the second distance being a distance between the first light-emitting section and the second light guide plate in the second direction.

2. The light-emitting unit according to claim 1, wherein the first light guide plate further includes a first rear surface, the first rear surface facing the first front surface, and having a first scattering structure in which another portion of the first light is scattered, the second light guide plate further includes a second rear surface, the second rear surface facing the second front surface, and having a second scattering structure in which another portion of the second light is scattered, and the first light guide plate and the second light guide plate are laminated to cause the first scattering structure and the second scattering structure to be overlapped with each other.

3. The light-emitting unit according to claim 2, wherein a luminance distribution of first scattered light that is provided by the first scattering structure and a luminance distribution of second scattered light that is formed by the second scattering structure are different from each other.

4. The light-emitting unit according to claim 1, further comprising a drive circuit that performs turn-on and turn-off of the plurality of first light-emitting sections independently of turn-on and turn-off of the plurality of second light-emitting sections.

5. The light-emitting unit according to claim 1, further comprising a plurality of third light-emitting sections that line up in the first direction, and emit third light individually, wherein the first light guide plate further includes a third end surface that is located on an opposite side of the first end surface and faces the third light-emitting sections, and the first light guide plate guides, along the second direction, a portion of the third light incoming from the third end surface, and outputs the guided portion of the third light from the first front surface.

6. The light-emitting unit according to claim 5, further comprising a plurality of fourth light-emitting sections that line up in the second direction, and emit fourth light individually, wherein the second light guide plate further includes a fourth end surface that is located on opposite side of the second end surface and faces the fourth light-emitting sections, and the second light guide plate guides, along the first direction, a portion of the fourth light incoming from the fourth end surface, and outputs the guided portion of the fourth light from the second front surface.

7. The light-emitting unit according to claim 6, wherein the first light guide plate further includes a first rear surface, the first rear surface facing the first front surface, and having a first scattering structure in which another portion of the first light and another portion of the third light are scattered, the second light guide plate further includes a second rear surface, the second rear surface facing the second front surface, and having a second scattering structure in which another portion of the second light and another portion of the fourth light are scattered, and the first light guide plate and the second light guide plate are laminated to cause the first scattering structure and the second scattering structure to be overlapped with each other.

8. The light-emitting unit according to claim 7, wherein a luminance distribution of first scattered light that is provided by the first scattering structure and a luminance distribution of second scattered light that is provided by the second scattering structure are different from each other.

9. The light-emitting unit according to claim 6, further comprising a drive circuit that independently performs turn-on and turn-off of the pluralities of first to fourth light-emitting sections.

10. The light-emitting unit according to claim 2, further comprising a light scattering member disposed to face the first front surface.

11. The light-emitting unit according to claim 10, further comprising a light reflective member disposed to face the second rear surface.

12. The light-emitting unit according to claim 1, wherein the first front surface is provided with a plurality of first cylindrical lenses that line up in the first direction, the plurality of first cylindrical lenses each including a first cylindrical surface extending in the second direction, and the second front surface is provided with a plurality of second cylindrical lenses that line up in the second direction, the plurality of second cylindrical lenses each including a second cylindrical surface extending in the first direction.

13. The light-emitting unit according to claim 6, wherein a third distance is shorter than a fourth distance, the third distance being a distance between the third light-emitting section and the first light guide plate in the second direction, the fourth distance being a distance between the third light-emitting section and the second light guide plate in the second direction, a fifth distance is shorter than a sixth distance, the fifth distance being a distance between the second light-emitting section and the second light guide plate in the first direction, the sixth distance being a distance between the second light-emitting section and the first light guide plate in the first direction, and a seventh distance is shorter than an eighth distance, the seventh distance being a distance between the fourth light-emitting section and the second light guide plate in the first direction, the eighth distance being a distance between the fourth light-emitting section and the first light guide plate in the first direction.

14. The light-emitting unit according to claim 6, further comprising a frame that includes a first portion to which the first light-emitting sections are attached, a second portion to which the second light-emitting sections are attached, a third portion to which the third light-emitting sections are attached, and a fourth portion to which the fourth light-emitting sections are attached, the first to fourth portions being joined to each other in order to provide a rectangular shape having four corner sections, wherein a thickness of the corner section in the frame is greater than a thickness of a portion, of the frame, other than the corner sections.

15. A display apparatus provided with a liquid crystal panel and a light-emitting unit, the light-emitting unit being disposed on rear side of the liquid crystal panel,
   the light-emitting unit comprising:
   a plurality of first light-emitting sections that line up in a first direction, and emit first light individually;
   a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction extending away from the first end surface;
   a plurality of second light-emitting sections that line up in the second direction, and emit second light individually; and
   a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, wherein
   the first light guide plate and the second light guide plate are laminated to cause the first front surface and the second front surface to be overlapped with each other, and
   a first distance is shorter than a second distance, the first distance being a distance between at least one of the plurality of first light-emitting sections and the first light guide plate in the second direction, the second distance being a distance between at least one of the plurality of the first light-emitting section and the second light guide plate in the second direction.

16. A lighting apparatus provided with a light-emitting unit,
   the light-emitting unit comprising:
   a plurality of first light-emitting sections that line up in a first direction, and emit first light individually;
   a first light guide plate that includes a first end surface and a first front surface, the first light guide plate guiding, along a second direction, a portion of the first light incoming from the first end surface, and outputting the guided portion of the first light from the first front surface, the first end surface extending along the first direction and facing the first light-emitting sections, the second direction being a direction extending away from the first end surface;
   a plurality of second light-emitting sections that line up in the second direction, and emit second light individually; and
   a second light guide plate that includes a second end surface and a second front surface, the second light guide plate guiding, along the first direction, a portion of the second light incoming from the second end surface, and outputting the guided portion of the second light from the second front surface, the second end surface extending along the second direction and facing the second light-emitting sections, wherein
   the first light guide plate and the second light guide plate are laminated to cause the first front surface and the second front surface to be overlapped with each other, and
   a first distance is shorter than a second distance, the first distance being a distance between at least one of the plurality of first light-emitting sections and the first light guide plate in the second direction, the second distance being a distance between at least one of the plurality of the first light-emitting sections and the second light guide plate in the second direction.

* * * * *